US006282300B1

(12) United States Patent
Bloom et al.

(10) Patent No.: US 6,282,300 B1
(45) Date of Patent: Aug. 28, 2001

(54) ROTATION, SCALE, AND TRANSLATION RESILIENT PUBLIC WATERMARKING FOR IMAGES USING A LOG-POLAR FOURIER TRANSFORM

(75) Inventors: Jeffrey A. Bloom, Plainsboro; Ingemar J. Cox, Lawrenceville; Matthew L. Miller; Min Wu, both of Princeton, all of NJ (US); Ching-Yung Lin, New York; Yui Man Lui, Middle Island, both of NY (US)

(73) Assignee: Signafy, Inc., Princeton, NJ (US)

( * ) Notice: Subject to any disclaimer, the term of this patent is extended or adjusted under 35 U.S.C. 154(b) by 0 days.

(21) Appl. No.: 09/489,752

(22) Filed: Jan. 21, 2000

(51) Int. Cl.[7] ...................................................... H04K 1/00
(52) U.S. Cl. ................................................................ 382/100
(58) Field of Search ...................................... 382/100, 232, 382/280; 380/210, 252, 287, 54; 713/176; 370/527, 529

(56) References Cited

U.S. PATENT DOCUMENTS 6,185,312 * 2/2001 Nakamura et al. .................. 382/100

FOREIGN PATENT DOCUMENTS

| 0 905 967 A1 | * | 3/1999 | (EP) | ................................ | H04N/1/32 |
| WO-99/ 17536-A1 | * | 4/1999 | (WO) | ............................... | H04N/1/32 |

OTHER PUBLICATIONS

Ó Ruanaidh et al., "Rotation, Scale and Translation Invariant Digital Image Watermarking," Proc. IEEE Int. Conf. on Image Processing, Oct. 1997, pp. 536–539.*

Ó Ruanaidh et al., "Rotation, Scale and Translation Invariant Spread Spectrum Digital Image Watermarking," Signal Processing, vol. 66, May 1998, pp. 303–317.*

Pereira et al., "Template Based Recovery of Fourier–Based Watermarks Using Log–polar and Log–log Maps," Proc. IEEE Int. Conf. on Multimedia Computing and Systems, Jun. 1999, pp. 870–874.*

Lin et al., "Public Watermarking Surviving General Scaling and Cropping: An Application for Print–and–Scan Process," Multimedia and Security Workshop at ACM Multimedia '99, Oct. 1999, pp. 41–46.*

* cited by examiner

*Primary Examiner*—Andrew W. Johns
(74) *Attorney, Agent, or Firm*—Scully, Scott, Murphy & Presser

(57) ABSTRACT

A method for detecting a watermark signal in digital image data. The detecting method includes the steps of: computing a log-polar Fourier transform of the image data to obtain a log-polar Fourier spectrum; projecting the log-polar Fourier spectrum down to a lower dimensional space to obtain an extracted signal; comparing the extracted signal to a target watermark signal; and declaring the presence or absence of the target watermark signal in the image data based on the comparison. Also provided is a method for inserting a watermark signal in digital image data to obtain a watermarked image. The inserting method includes the steps of: computing a log-polar Fourier transform of the image data to obtain a log-polar Fourier spectrum; projecting the log-polar Fourier spectrum down to a lower dimensional space to obtain an extracted signal; modifying the extracted signal such that it is similar to a target watermark; performing a one-to-many mapping of the modified signal back to log-polar Fourier transform space to obtain a set of watermarked coefficients; and performing an inverse log-polar Fourier transform on the set of watermarked coefficients to obtain a watermarked image.

14 Claims, 27 Drawing Sheets

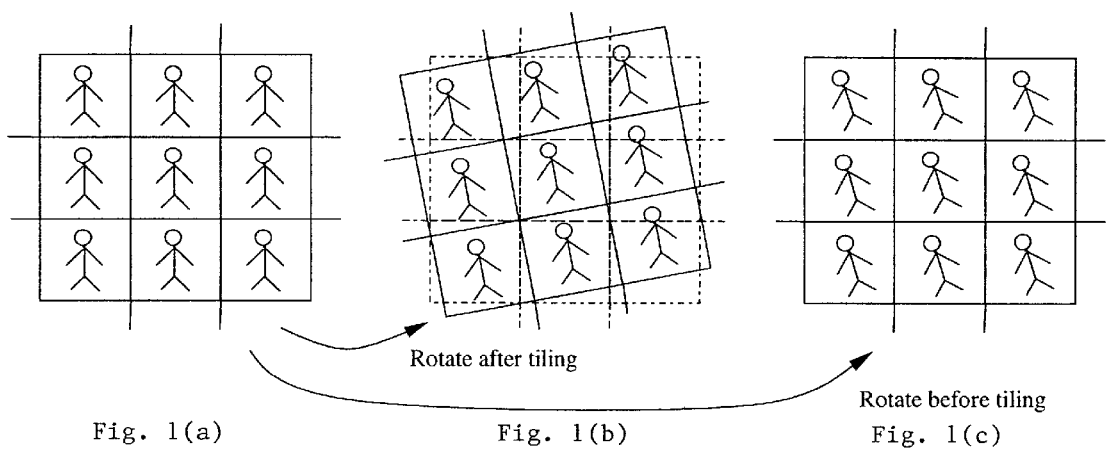
Fig. 1(a)  Fig. 1(b) Rotate after tiling  Fig. 1(c) Rotate before tiling

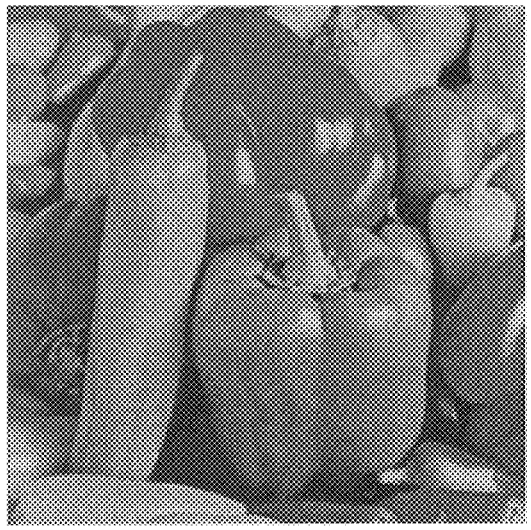 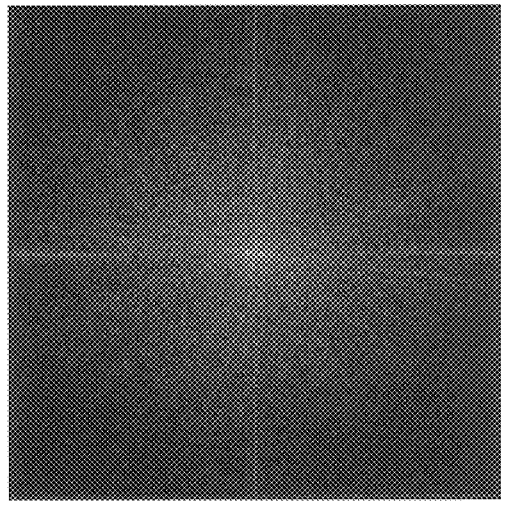
Fig. 2(a)　　　　　　　　　　Fig. 2(b)
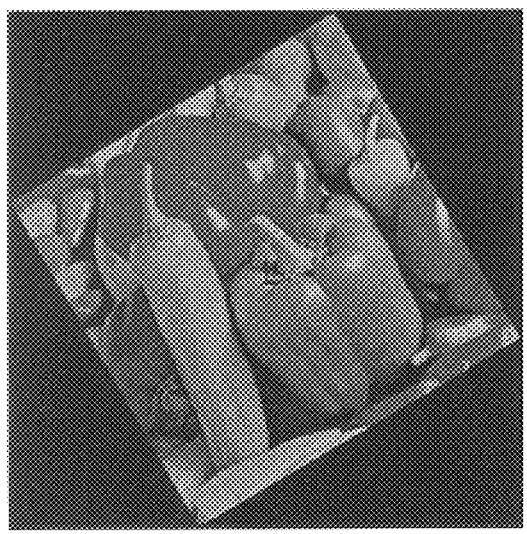 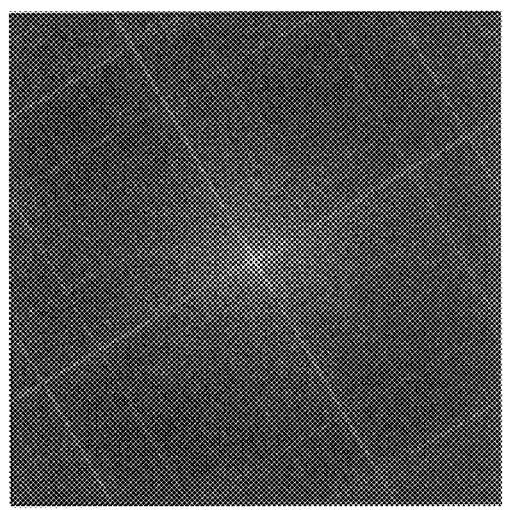
Fig. 3(a)　　　　　　　　　　Fig. 3(b)

ROTATION, SCALE, AND TRANSLATION RESILIENT PUBLIC WATERMARKING FOR IMAGES USING A LOG-POLAR FOURIER TRANSFORM

BACKGROUND OF THE INVENTION

1. Field of the Invention

The present invention relates generally to watermarking of digital images and, more particularly, to methods for inserting/detecting a watermark into/from digital data that are resilient to rotation, scale and/or translation of the images.

2. Prior Art

There has been much emphasis on the robustness of watermarks to common signal processing operations such as compression and signal filtering. However, recently it has become clear that even very small geometric distortions can prevent the detection of a watermark. This problem is most pronounced when the original unwatermarked image is unavailable to the detector. Conversely, if the original image is available to the detector, then the watermarked image can often be registered to the original and thereby inverted. A public watermark requires that detection of the watermark be performed without access to the original unwatermarked image. As such, it is not possible to invert the geometric distortion based on registration of the watermarked and original images.

Before proceeding further, it is important to define what is meant by the geometric distortions of rotation, scale and translation. Specifically, we are interested in the situation in which a watermarked image undergoes an unknown rotation, scale and/or translation prior to the detection of the watermark. The detector should detect the watermark if it is present. This definition is somewhat obvious, so it may be more useful to describe what we are not interested in. In particular, some watermark algorithms claim robustness to scale changes by first embedding a watermark at a canonical scale, then changing the size of the image and finally, at the detector, scaling the image back to the canonical size prior to correlation. In our opinion, the detector does not see a scale change. Rather, the process is more closely approximated by a low pass filtering operation that occurs when the image is reduced in size. Similarly, tests that rotate an image by some number of degrees and subsequently rotate the image by the same amount in the opposite direction are not adequate tests of robustness to rotation. The same is true for translation. The common situation we are concerned with occurs when a watermarked image is printed and then cropped or padded and scanned back into the digital domain. In these circumstances, the image dimensions have changed both because of cropping and possibly scaling. There is also likely to be an associated translational shift. In this example, scaling to a canonical size does not undo the scaling. Rather, if the cropping is not symmetric in both the rows and columns, then scaling to a canonical size will result in a change in the aspect ratio of the image. Changes in aspect ratio are not addressed in this paper.

One strategy known in the art for detecting watermarks after geometric distortion is to try to identify what the distortions were, and invert them before applying the watermark detector. Methods have been developed in the prior art to accomplish this by embedding a registration pattern along with the watermark.

One problem with this solution is that it requires the insertion and detection of two watermarks, one for registration and one to carry the data payload. Thus, this approach is more likely to reduce the image fidelity. A second problem arises because all images watermarked with this method will share a common registration watermark. This fact may improve collusion attempts to discern the registration pattern and, once found, the registration pattern could be removed from all watermarked images thus restricting the invertibility of any geometric distortions.

Another way to implement the above strategy is to give the watermark a recognizable structure. For example, the watermark might be encoded with a small, rectangular pattern, and embedded several times in the image in a tiled grid. Then, regardless of the watermark pattern, the grid structure can be recognized by looking at the autocorrelation function of the image, which would contain a corresponding grid of peaks. These peaks can be analyzed to identify any affine distortions.

The methods of the present invention apply an alternative strategy, which is based on developing a watermark that is invariant to geometric distortions, so that there is no need to identify and invert them. In particular, the methods of the present invention are concerned with distortions due to rotation, scale, and/or translation (RST). While these geometric distortions have recently become of interest to the watermarking community, they have long been of interest to the pattern recognition community. A comprehensive discussion of the pattern recognition literature is well known in the art and as such are not discussed herein. Pattern recognition methods describe the use of moment invariants for visual pattern recognition of planar geometric figures. It has been shown that these classic moment invariants are equivalent to the radial moments of circular-harmonic functions (CHF's) that arise from a Mellin transform of the log-polar representation of an image when the complex Mellin radial frequency s, is a real integer $s \geq 1$.

The Fourier-Mellin transform is closely related to the algorithm described in these pattern recognition methods of the prior art. There are a variety of related ideas from pattern recognition. First, the signal-to-noise ratio of the correlation peak between two images decreases from 30 db to 3 dB with either a 2% scale change or a 3.5° rotation. Thus, some have proposed what is essentially a hybrid opto-electronic implementation of the Fourier-Mellin transform. Others have discussed implementation issues related to the discrete Fourier-Mellin transform. These include interpolation, aliasing, and spectral border effects, which are discussed in detail below.

Still others have described a conformal-log mapping that is very closely related to the Fourier-Mellin transform. And still yet, others have discussed the use of the Fourier-Mellin and other transforms for pattern recognition.

These methods discuss a number of absolute or strong invariants based on the phase of the Fourier or Fourier-Mellin spectrums. The terms "absolute" and "strong" refer to the fact that all information about an image except that of position, orientation or scale is preserved. This may be important for recognition tasks, especially if the library of objects is large. While some of those in the art discuss this issue in more detail, we do not believe that strong invariants are necessary for watermarking applications.

It is important to realize that watermark detection is different from the general problem of recognizing an object. First, an N-bit watermark only requires recognition of N independent patterns. Since N is typically between 32 and 64, this is considerably smaller than a practical object recognition database. Second, the watermark is not a naturally occurring object but is artificially inserted into an image. As such, the watermark can be designed to be easily represented. In particular, it is often advantageous to represent the watermark as a one-dimensional projection of the image space. If properly designed this has the benefit of reducing a two-dimensional search to one dimension, thereby significantly reducing the computational cost. Finally, since the set of watermarks is small (compared with the number of naturally occurring objects in a scene) and artificially created, it is not necessary that the image transform be strongly invariant as it is not as important to be able to reconstruct the image modulo rotation, scale, and/or translation from the parameterization.

There are those in the art who first suggested a watermarking method based on the Fourier-Mellin transform. However, they note very severe implementation difficulties which has likely hampered further work in this area. They choose to use a transformation that is strongly invariant claiming that it is more convenient to use strong invariants because the last stage of embedding a mark involves inverting the invariant representation to obtain the (marked) watermarked image.

We believe that invertibility is not essential. Following the formulation of those who first suggested that watermarking be viewed as communications with side information at the transmitter, suppose we have a non-invertible extraction function, $X(C)$, that maps a piece of media, C, into an extracted signal. Such a function would be used as part of a detection strategy. We can often define an embedding function, $Y(w,C)$, which finds a new piece of media, $C_w = Y(w,C_0)\$$, such that $$X(C_w) = X(Y(w,C_0)) \qquad (1)$$

and $X(C_0)$ is approximately equal to w, and $C_w$ is perceptually similar to $C_0$. In other words, the watermarked image looks like the original and the vector extracted during detection looks like the watermark vector. This function is sufficient for use in a watermark embedder.

There have been a number of other recent watermarking algorithms designed to deal with geometric distortions. Of particular note is the recent work which describes an algorithm based on the detection of salient features in an image and the insertion of signals relative to these salient features. Experimental results indicate that the method is robust to mirror reflection and rotation but fails to survive other distortions. A somewhat related set of methods have been described by others. These methods are based on geometrically warping local regions of an image onto a set of random lines. However, currently, these methods are not robust to geometric distortions, but rather, allow for a rapid, but exhaustive search through the possible set of geometric distortions.

SUMMARY OF THE INVENTION

Therefore it is an object of the present invention to provide a method for watermark insertion/detection into/ from an image in which the watermark is resilient to rotation, scale and/or translation, and in which the unwatermarked image does not have to be available to a detector.

It is a further object of the present invention to provide a method for watermark insertion/detection into/from an image in which image fidelity is not appreciably reduced.

It is yet a further object of the present invention to provide a method for watermark insertion/detection into/from an image which does not require the insertion and detection of two watermarks, one for registration and one to carry a data payload.

It is still yet a further object of the present invention to provide a method for watermark insertion/detection into/ from an image which does not require the identification of a geometric distortion and the inversion thereof.

Accordingly, a method for detecting a watermark signal in digital image data is provided. The detecting method comprises the steps of: computing a log-polar Fourier transform of the image data to obtain a log-polar Fourier spectrum; projecting the log-polar Fourier spectrum down to a lower dimensional space to obtain an extracted signal; comparing the extracted signal to a target watermark signal; and declaring the presence or absence of the target watermark signal in the image data based on the comparison.

Also provided is a method for inserting a watermark signal in digital image data to obtain a watermarked image. The inserting method comprises the steps of: computing a log-polar Fourier transform of the image data to obtain a log-polar Fourier spectrum; projecting the log-polar Fourier spectrum down to a lower dimensional space to obtain an extracted signal; modifying the extracted signal such that it is similar to a target watermark; performing a one-to-many mapping of the modified signal back to log-polar Fourier transform space to obtain a set of watermarked coefficients; and performing an inverse log-polar Fourier transform on the set of watermarked coefficients to obtain a watermarked image.

BRIEF DESCRIPTION OF THE DRAWINGS

These and other features, aspects, and advantages of the methods of the present invention will become better understood with regard to the following description, appended claims, and accompanying drawings where:

FIGS. 1a, 1b, and 1c illustrate an image having a conventional rectilinear tiling grid which is rotated after and before tiling, respectively.

FIGS. 2a and 2b illustrate an image and its Discrete Fourier Transform (DFT), respectively.

FIGS. 3a and 3b illustrate the image of FIG. 2a rotated and its DFT.

FIG. 12e illustrates the original unpadded image of FIG. 12a.

DETAILED DESCRIPTION OF THE PREFERRED EMBODIMENT

Watermark Insertion (Embedding) Process

Figure 4A:
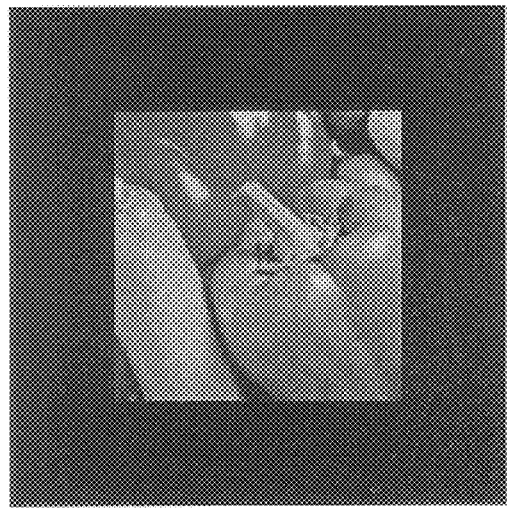
FIGS. 4a and 4b illustrate the image of FIG. 3a cropped and its DFT.

Consider an image i(x,y) and a rotated, scaled, and translated (RST) version of this image, i'(x,y). Then we can write $$i'(x,y) = i(\sigma(x \cos \alpha + y \sin \alpha) - x_o, \sigma(-x \sin \alpha + y \cos \alpha) - y_o) \quad (2)$$

where the RST parameters are $\alpha$, $\sigma$, and $(x_o, y_o)$ respectively.

The Fourier transform of i'(x,y) is, I'($f_x$, $f_y$) the magnitude of which is given by:

$$|I'(f_x, f_y)| = |\sigma|^{-2} |I(\sigma^{-1}(f_x \cos \alpha + f_y \sin \alpha), \sigma^{-1}(-f_x \sin \alpha + f_y \cos \alpha))| \quad (3)$$

Equation 3 is independent of the translational parameters, $(x_o, y_o)$. This is the well known translation property of the Fourier transform.

If we now rewrite Equation 2 using log-polar coordinates, i.e.

$$f_x = e^\rho \cos \theta \quad (4)$$

$$f_y = e^\rho \sin \theta \quad (5)$$

then the magnitude of the Fourier spectrum can be written as $$|I'(f_x, f_y)| = |\sigma|^{-2} |I(\sigma^{-1} e^\rho \cos (\theta - \alpha), \sigma^{-1} e^\rho \sin (\theta - \alpha))| \quad (6)$$

$$= |\sigma|^{-2} |I(e^{(\rho - \log \sigma)} \cos (\theta - \alpha), e^{(\rho - \log \sigma)} \sin (\theta - \alpha)| \quad (7)$$

or $$|I'(\rho, \theta)| = |\sigma|^{-2} |I(\rho - \log \sigma, \theta - \alpha)|. \quad (8)$$

Equation 8 clearly indicates:
1. that the amplitude of the log-polar spectrum is scaled by $|\sigma|^{-2}$,
2. that image scaling results in a translational shift of log $\sigma$ along the $\rho$ axis, and
3. that image rotation results in a cyclical shift of $\alpha$ along the $\theta$ axis.

We need not be concerned with the amplitude scaling of the spectrum, since we intend to perform watermark detection using the correlation coefficient, which is invariant to this scaling.

Next, $g(\theta)$ is defined to be a one-dimensional projection of $|I(\rho, \theta)|$ such that $$g(\theta) = \sum_j \log(|I(\rho_j, \theta)|) \quad (9)$$

The reason for summation of the log values rather than the magnitudes themselves is discussed below. Due to the symmetry of the spectra of real images, $$|F(x,y)| = |F(-x,-y)|, \quad (10)$$

we only compute $g(\theta)$ for $\theta \in [0° \ldots 180°)$.

We find it convenient to add the two halves of $g(\theta)$ together, obtaining $$g_1(\theta') = g(\theta') + (\theta' + 90°) \quad (11)$$

with $\theta' \in [0° \ldots 90°)$. The reasons for this are also discussed below.

Clearly, $g_1(\theta)$, is invariant to both translation and scaling. However, rotations result in a (circular) shift of the values of $g_1(\theta)$. If $\theta$ is quantized to the nearest degree, then there are only 90 discrete shifts, and we handle this by an exhaustive search.

Watermark Detection Process

In principle, detectors may be built that can handle watermarks encoding several bits. However, the detector of the present invention determines only whether or not a given watermark has been embedded in a given image. It takes as input, an image i, and a watermark w, and the output is a single bit indicating whether image i contains watermark w.

The watermark w, is expressed as a vector of length N. To determine whether the watermark is present, we first compute an "extracted signal" v, from image i, by computing the descriptor $g_1(\theta)$, for N values of $\theta$ evenly spaced between 0° and 90°. We then compute the correlation coefficient between w and v. If the correlation coefficient is above a detection threshold T, then the image is judged to contain the watermark. The use of correlation coefficient as a detection measure is known in the art. One benefit of this metric is its independence to scaling of the signal amplitudes.

Thus, the basic method for watermark detection proceeds as follows:

1. Compute a discrete log-polar Fourier transform of the input image. This can be thought of as an array of M rows by N columns, in which each row corresponds to a value of $\rho$, and each column corresponds to a value of $\theta$.

2. Sum the logs of all the values in each column, and add the result of summing column j to the result of summing column j+N/2(j=0 . . . (N/2−1)) to obtain an invariant descriptor v, in which $$v_j = g_1(\theta_j) \tag{12}$$

where $\theta_j$ is the angle that corresponds to column j in the discrete log-polar Fourier transform matrix.

3. Compute the correlation coefficient D, between v and the input watermark vector w, as $$D = \frac{w \cdot v}{\sqrt{(w \cdot v)(v \cdot v)}} \tag{13}$$

4. If D is greater than a threshold T, then indicate that the watermark is present. Otherwise, indicate that it is absent.

Once a method for detecting watermarks has been defined, a watermark embedding algorithm can be constructed according to methodology known in the art. In the methods known in the art, watermarking is cast as a case of communications with side information at the transmitter. The difference between this view of watermarking, and a more common view known in the art, is as follows.

In most public watermarking methods known in the art, the original image is considered to be noise. The embedder adds a small-amplitude signal to this noise, and the detector must be sensitive enough to work with the small signal-to-noise ratio that results.

However, this common approach ignores the fact that the embedder has complete knowledge of the "noise" caused by the original image. If we view the embedder as a transmitter and the cover image as a communications channel, then this knowledge amounts to side-information about the behavior of that channel. When the transmitter knows ahead of time what noise will be added to the signal, its optimal strategy is to subtract that noise from the signal before transmission. The noise then gets added back by the communications channel, and the receiver receives a perfect reconstruction of the intended signal.

In the case of watermarking, it is unacceptable for the embedder to subtract the original image from the watermark before embedding the watermark, because it would result in unacceptable fidelity loss. In fact, if the watermark is expressed as a pattern that is the same size as the image, then this strategy simply replaces the image with the watermark pattern, which is clearly too drastic. However, when the watermark is expressed as a signal in a lower-dimensional space, as is the case with the present system, the results need not be so drastic, since a wide variety of full-resolution images project into the same extracted signal and the embedder may choose the one that most resembles the original. But even in the case of lower-dimensional watermarks, it is not always possible to completely replace the extracted signal with the watermark signal while maintaining acceptable fidelity.

To make maximal use of the side-information at the embedder, while maintaining acceptable fidelity, a method known in the art introduces the idea of a "mixing function", f(v,w). This takes an extracted signal v, and a watermark vector w, as input, and the output is a signal s, which is perceptually similar to v, and has a high correlation with w. Since s is something between v and w, it is referred to as the "mixed signal". It is this mixed signal that the embedder transmits, by modifying the image so that the extraction process in the detector will produce s.

The basic pattern for this type of embedding described in the art consists of three steps:

1. Apply the same signal-extraction process to the unwatermarked image as will be applied by the detector, thus obtaining an extracted vector, v. In our case, this means computing $g_1(\theta)$.

2. Use the mixing function, s=f(v,w), to obtain a mixture between v and the desired watermark vector, w. At present, a mixing function which simply computes a weighted average of w and v is utilized. This is obviously not a preferred or optimal approach. However, it should be apparent to those skilled in the art that more sophisticated methods now known or later developed can also be used.

3. Modify the original image so that, when the signal-extraction process is applied to it, the result will be s instead of v.

Step 3 is the most difficult. A natural approach would be to modify all the values in column j of the log-polar Fourier transform so that their logs sum to $s_j$ instead of $v_j$. This can be done, for example, by adding $(s_j - v_j)/M$ to each of the M values in column j. Next, the log-polar resampling of the Fourier magnitudes would be inverted, thus obtaining a modified, Cartesian Fourier magnitude. Finally, the complex terms of the original Fourier transform would be scaled to have the new magnitudes found in the modified Fourier transform, and the inverse Fourier transform would be applied to obtain the watermarked image.

The main implementation issue in such an approach is the inherent instability in inverting the log-polar resampling. The methods of the present invention therefore approximate this step with an iterative method in which a local inversion of the interpolation function is used for the resampling. This method is described below.

Implementation Problems and Solutions

There are a number of problems that arise when implementing the previous methods discussed above. Several of these are addressed below.

Rectilinear Tiling Implied by DFT

The log-polar Fourier transform of an image can be computed by resampling the image DFT with a log-polar grid. Some interpolation method must be used during the resampling, since the log-polar sample points don't generally coincide with the Cartesian sample points in the DFT.

The DFT is conventionally assumed to represent a tiled version of an image, as illustrated in FIG. 1(a). Those in the art have suggested that this tiling pattern represents an inherent problem for any algorithm that relies on the rotational properties of Fourier transforms, since, when the content of an image is rotated, the rectilinear tiling grid is not rotated along with it. Thus, the DFT of a rotated image is not the rotated DFT of that image. This problem is illustrated in FIGS. 1(b) and (c).

One possible solution is to compute the log-polar Fourier transform directly, without using the Cartesian DFT as an intermediate step. In the continuous Fourier domain, each point has a value determined by correlating the image with a complex, planar sinusoid. If we wish to obtain a value for a point between those that would be sampled in a DFT, we can find the corresponding sinusoid and directly compute its correlation with the image. This amounts to assuming that all the pixel values outside the bounds of the image are black, rather than assuming they are tiled copies of the image.

Of course, the direct approach described above doesn't take advantage of the efficient methods available for computing DFT's, and is thus likely to be prohibitively expensive. Instead, one can approximate the log-polar Fourier transform with the following steps:

1. Pad the image with black to obtain a larger image.
2. Take the DFT of the padded image. This yields a more finely sampled version of the continuous Fourier transform.
3. Resample in a log-polar grid, using an inexpensive interpolation technique. The preferable technique used is linear interpolation of the magnitudes of the coefficients.

By padding with black to obtain a denser sampling of the Fourier transform, we reduce the distances between the DFT's sample points and the log-polar sample points, thus reducing the error introduced by inexpensive interpolation.

Difficulty of Inverting Log-Polar Mapping

Each element of the log-polar Fourier magnitude array is a weighted average of up to four elements of the Cartesian Fourier magnitude array. Thus, we can write $$F = MC \tag{14}$$

Where F is a column vector containing all the elements of the log-polar array, C is a column vector containing the elements of the Cartesian array, and M contains the weights used to perform interpolation. If we wish to modify the log-polar array so that it contains the watermark, and then find the corresponding Cartesian array, we have to find the inverse of M. Unfortunately, M is ill-conditioned and it is not practical to perform this inversion precisely.

Instead, one can use an iterative process to perform an approximate inversion. Let F' be the modified version of F. We begin by observing that the four non-zero values in each row of M sum to 1. Thus, if we add $F'_i - F_i$ to each of the elements $C_{j1} \ldots C_{j4}$, where $M_{i,j1} \ldots M_{i,j4}$ are non-zero, then the resulting Cartesian array will yield $F'_i$ in its log-polar mapping.

Unfortunately, if we try to apply this method to change all the elements of F, we'll have conflicting changes in the various elements of C. For example, both $M_{i,j}$ and $M_{k,j}$ might be non-zero, so that we'd want to change $C_j$ both when changing $F_i$ to $F'_i$ and when changing $F_k$ to $F'_k$. The desired changes are unlikely to be the same. We resolve this problem by using a weighted average of all the desired changes to each element of C. So, in the above example, we would change the value of $C_j$ by $$\frac{M_{i,j}(F'_i - F_i) + M_{k',j}(F'_k - F_k)}{M_{i,j} + M_{k,j}} \tag{15}$$

(assuming that $M_{i,j}$ and $M_{k,j}$ are the only nonzero elements of column j).

The above method results in a rough approximation to the desired inversion. We can obtain successively better approximations by applying the operation iteratively. In practice, we find it most effective to iterate the entire watermark embedding process described above, using the above approximate log-polar inversion in each iteration. In practice, it has been found that three or four iterations usually suffice to produce an approximation that can be detected by the detector.

Orientation of Image Boundaries

It is well known that the rectangular boundary of an image usually causes a "cross" artifact in the image's energy spectrum (see FIGS. 2a and 2b). This happens because there is usually a large discontinuity at each edge of the image due to the implicit tiling. The DFT magnitude of such vertical and horizontal discontinuities has large energy in all the vertically and horizontally oriented frequencies, which results in the cross artifact.

Figure 4B:
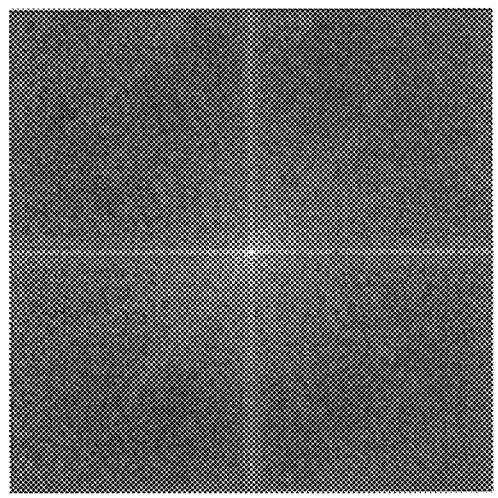

If the image is rotated, but padded with black so that no image content is cropped, then the cross in the DFT magnitude will also rotate (FIGS. 3a and 3b). If, on the other hand, the rotated image is cropped, so that no black is added, then the new image boundaries cause a horizontal and vertical cross similar to that found in the original image, even though the rest of the DFT magnitude is rotated (FIGS. 4a and 4b). Since the cross has so much energy, it tends to cause two large bumps in the extracted watermark vector, which substantially reduce the correlation coefficient with the embedded watermark.

A solution to this problem is to simply ignore the bumps in the extracted signal by ignoring a neighborhood around each of the two highest-valued elements. Alternative solutions that appear in the literature include multiplication of the image by a circularly-symmetric window and blurring of the image edges. These solutions are probably more general than the one employed here, but would require modification to the watermark embedder.

Dynamic Range of Frequency Magnitudes

The magnitude of low frequencies can be very much larger than the magnitude of mid and high frequencies. In these circumstances, the low frequencies can become overwhelming. To reduce this problem, we sum the logs of the magnitudes of the frequencies along the columns of the log-polar Fourier transform, rather than summing the magnitudes themselves.

A beneficial side-effect of this is that a desired change in a given frequency is expressed as a fraction of the frequency's current magnitude rather than as an absolute value. This is better from a fidelity perspective.

Unreliability of Extreme Frequencies

It is well known that the lowest and highest frequencies in an image are usually unreliable for watermarking. The low frequencies are unreliable because they are difficult to modify without making visible changes in the image. The high frequencies are unreliable because they can be easily modified by common processes such as compression, printing, and analog transmission. Our solution is to neglect these unreliable frequencies when extracting the watermark.

A better solution would be to use a perceptual model to estimate the maximum amount of change that can be applied to each frequency and a model of specific attacks to estimate the degree of robustness. The amount of watermark energy embedded into each frequency would then be proportional to this perceptual significance and robustness. Such an approach is known in the art. Application of this idea can also be applied to the present watermarking method.

Images are Rotationally Asymmetric

Figure 5A:
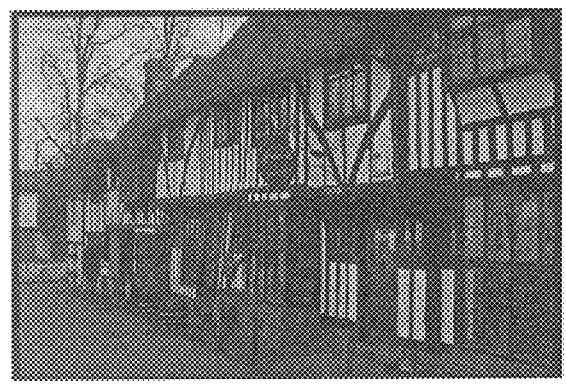
FIGS. 5a and 5b illustrate an image with dominant vertical structure and its DFT.

The energy in an image is seldom evenly distributed in angular frequency. Images frequently have a large amount of energy in one group of directions, while having much lower energy in an orthogonal group of directions. For example, images containing buildings and trees have significant vertical structure yielding more energy in the horizontal frequencies than in the vertical (FIGS. 5a and 5b), while seascapes or sunsets are strongly oriented in the horizontal direction yielding higher vertical frequencies (FIGS. 6a and 6b).

Figure 5B:
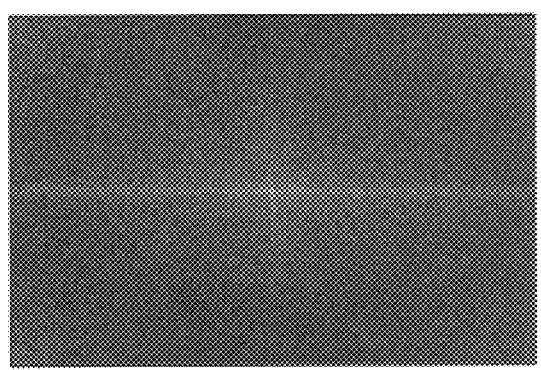
Figure 6A:
FIGS. 6a and 6b illustrate an image with dominant horizontal structure and its DFT.
Figure 6B:
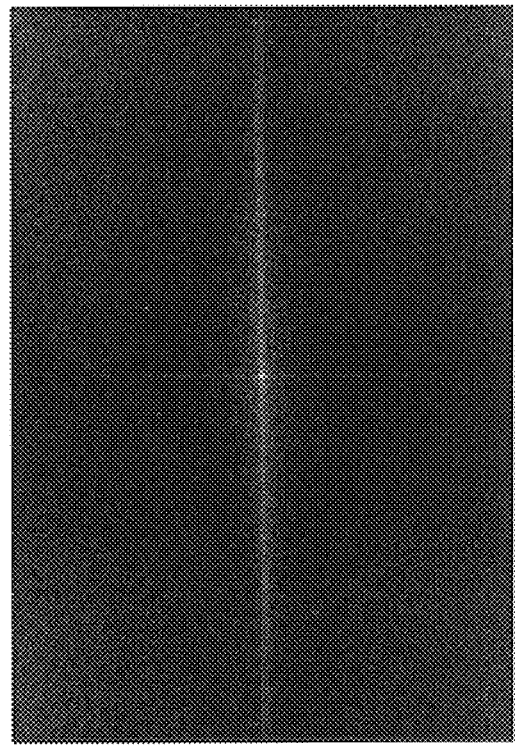

Spectra such as those of FIGS. 5b and 6b suggest an uneven masking ability in orthogonal directions. As a consequence, it may be much easier, from a fidelity perspective, to embed some portions of the watermark than other portions of the watermark. For example, when watermarking the image of tall buildings, we can more easily hide noise with a strong vertical component than noise with a strong horizontal component. This can be a problem if the difficult-to-modify portions of the watermark are critical in differentiating it from other watermarks.

To reduce this problem, we divide the extracted signal into two halves, and add the two halves together. Thus, rather than using $g(\theta)$ of Equation 9, we use $g_1(\theta)$, of Equation 11.

If we want to modify an element of $g_1(\theta)$, we can do so by hiding noise that's oriented along either angle $\theta$ or angle $\theta+90°$. This increases the likelihood that each element of the watermark can be embedded within the fidelity constraints.

High correlation Between Elements of Extracted Watermark

For natural images, $g_1(\theta)$ is likely to vary smoothly as a function of $\theta$. In other words, the extracted signal will have more low-frequency content than high-frequency content. This reduces the effectiveness of the correlation coefficient as a detection measure.

We improve the detection measure by applying a whitening filter to both the extracted signal and the watermark being tested for before computing the correlation coefficient. Note that the whitening filter is employed only in the watermark detector; the embedder is unchanged. The whitening filter was designed to decorrelate the elements of signals extracted from natural images, and was derived from signals extracted from 10,000 images from a publically available photo image library (these images were not used in any of the subsequent experiments reported below).

The idea of using a whitening filter to improve watermark detection in this way is also known in the art.

Interrelation Between Changes Made in Watermark Elements

During watermark embedding, it is difficult to change the value of one element of the extracted watermark, without changing the values of its neighbors. This results primarily from the fact that any one frequency in the DFT can effect several values of $g_1(\theta)$, so changing that frequency can effect several elements of the watermark. Because of this, it is difficult to embed a watermark that varies wildly from one element to the next.

We reduce this problem by replicating elements of the desired watermark to obtain a lower-frequency watermark. For example, if the watermarks are extracted by computing 74 samples of $g_1(\theta)$ (after removing the samples that contain the "bumps" discussed above), then we would define our desired watermark as a vector of 37 values, and duplicate each of its 37 values to obtain a length 74 vector.

Experimental Results

The following results were obtained by extracting a length 90 vector form the image and neglecting the 16 samples surrounding the peak (assumed to correspond to the DFT cross artifact). This leaves a descriptor that is 74 samples in length.

The detection process involves a comparison of the watermark with all cyclic rotations of the extracted descriptor. Note that there are 90 such rotations.

False Positives

We begin our evaluation of the watermarking method of the present invention by finding the relationship between the threshold, T, and the probability of false positives, $P_{fp}$. A false positive occurs when the detector incorrectly concludes that an unwatermarked image contains a given watermark. So $$P_{fp}=P\{D_{max}>T\} \quad (16)$$

where $D_{max}$ is a detection value obtained by running the detector on a randomly selected, unwatermarked image.

Figure 7A:
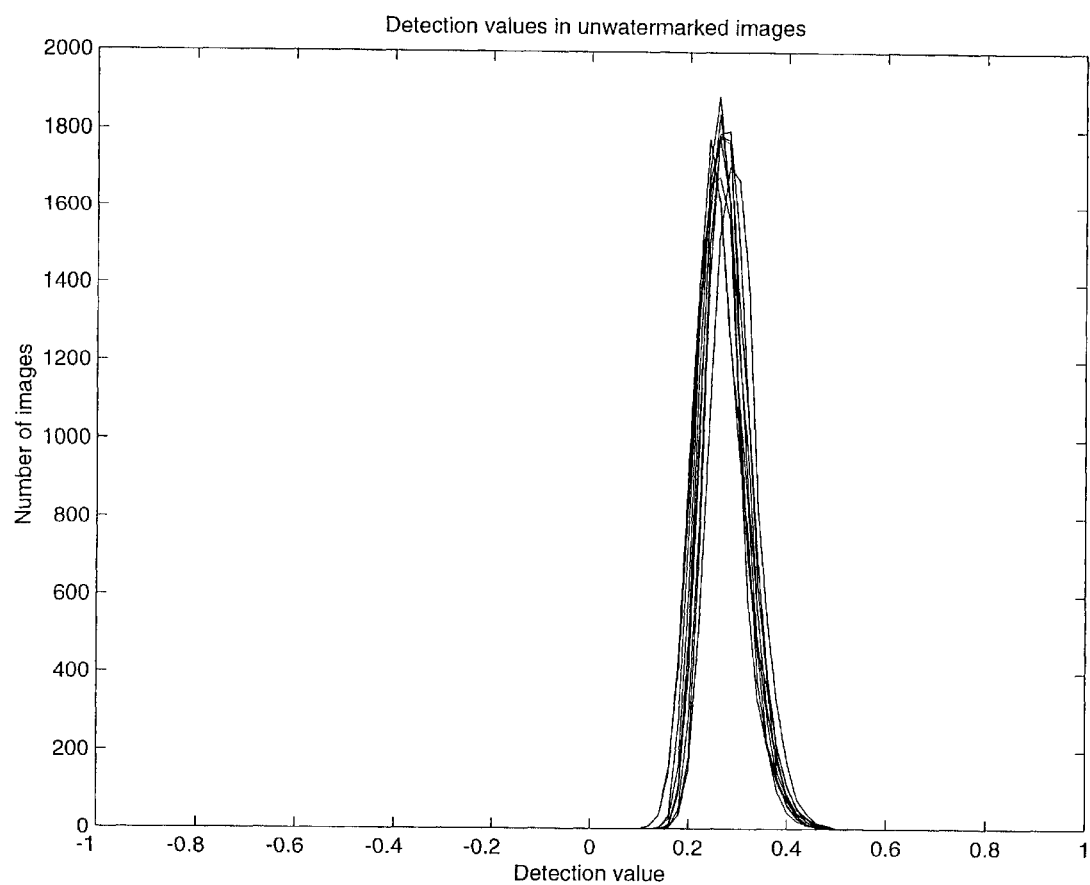
FIG. 7a is a detection value distributions graph for ten watermarks in 10,000 unwatermarked images illustrating maximum detection value for each watermark/image pair.

To estimate $P_{fp}$ empirically, we ran the detector on 10,000 unwatermarked images from a commercially available image database, The 10,000 images used in this test were all different from the 10,000 images from the same database that were used to generate the whitening filter described above, testing for 10 different binary watermarks in each. FIG. 7(a) shows the 10 resulting histograms, superimposed on one another.

Figure 7B:
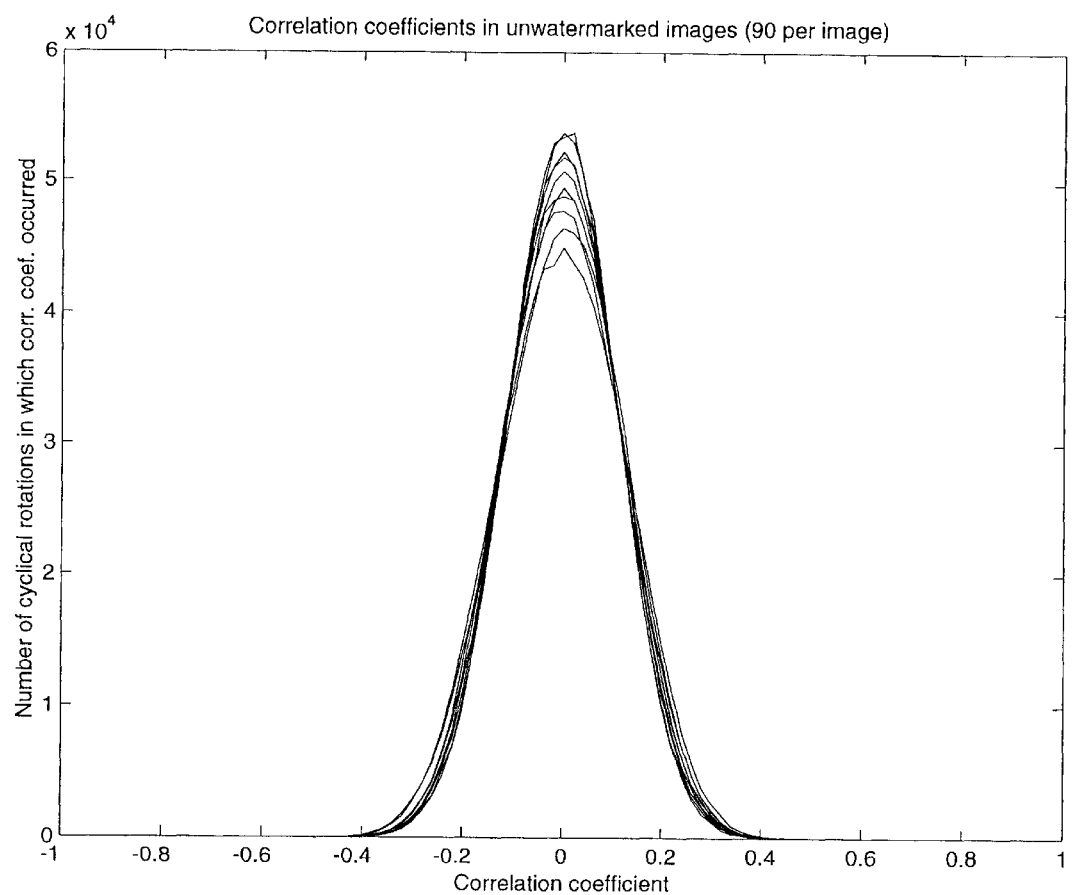
FIG. 7b is a detection value distributions graph for ten watermarks in 10,000 unwatermarked images illustrating all 90 detection values for each watermark/image pair.

FIG. 7(a) indicates that most detection values from unwatermarked images fall between 0.2 and 0.4. This might seem surprising, since we might expect unwatermarked images to yield detection values closer to zero. The reason the values are so high is that each one is the maximum of 90 different correlation coefficients, computed during the cyclical search discussed above. This means that $$s(T)=P\{D_{max}>T\}=P\{D_0>T\} \text{ or } (D_1>T) \text{ or } \ldots (D_{89}>T\} \quad (17)$$

where $D_0$ are the 90 correlation coefficients computed during the search. Each of $D_0 \ldots D_{89}$ is drawn from a distribution that is centered around zero, as shown in FIG. 7(b), which shows 10 superimposed histograms of the 90,000 correlation coefficients computer for each of the 10 watermarks during the experiment. The maximum of 90 values drawn from a distribution like that in FIG. 7(b) is likely to be higher than zero.

During the experiment with unwatermarked images, the highest detection value obtained was 0.55. Thus, we have no data for estimating $P_{fp}$ for T>0.55. To estimate this, we must employ a theoretical model. One such theoretical model says that, if D is the correlation coefficient between a preselected d-dimensional watermark vector and a random vector drawn from a radially-symmetric distribution, then $$P\{D > T\} = R(T, d) = \frac{\int_0^{\cos^{-1}(T)} \sin^{d-2}(u) du}{2\int_0^{\pi/2} \sin^{d-2}(u) du} \quad (18)$$

Figure 8A:
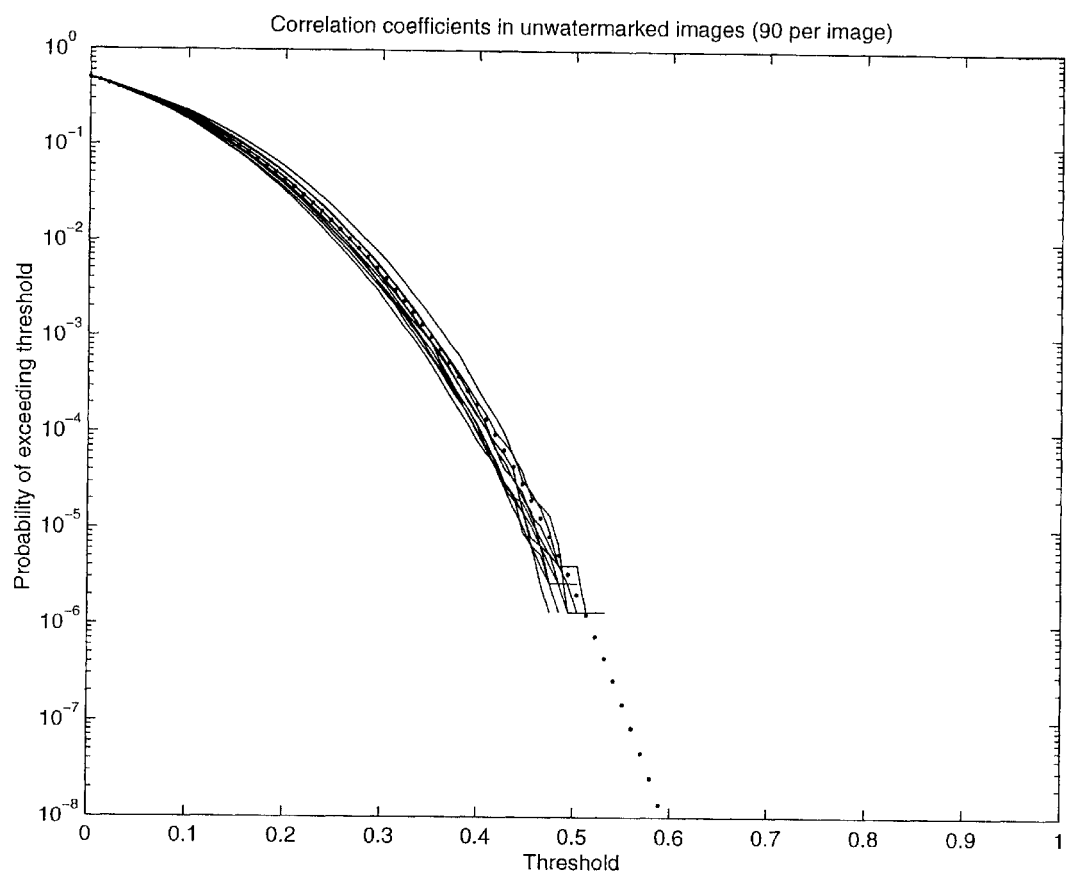
FIG. 8a is a graph of false positive rates measured with the individual correlation coefficients from 10,000 unwatermarked images, plotted with theoretical estimates.

The whitening filter employed in our detector makes the distribution roughly spherical, so we can expect this model to apply to the present system, with d=74. However, the model only gives the probability that one correlation coefficient is greater than the threshold, not the probability that the maximum of several coefficients is greater. Thus, it should give us $P\{D_i>T\}$, i$\in$[0 . . . 89], rather than $P\{D_{max}>T\}$. FIG. 8(a) indicates how well the model predicted $P\{Di>T\}$ in our experiment.

We obtain an estimated upper bound on $P\{D_{max}>T\}$ by observing that $$P\{Q_0 \text{ or } Q_1 \text{ or } \ldots Q_{n-1}\} \leq \min\left(1, \sum_i P\{Q_i\}\right) \quad (19)$$

When Qi corresponds to the event ($D_i$>T), and n=90, we obtain $$P\{D_{max}>T\} \leq \min(1, 90 \times R(T, 74)). \quad (20)$$

Figure 8B:
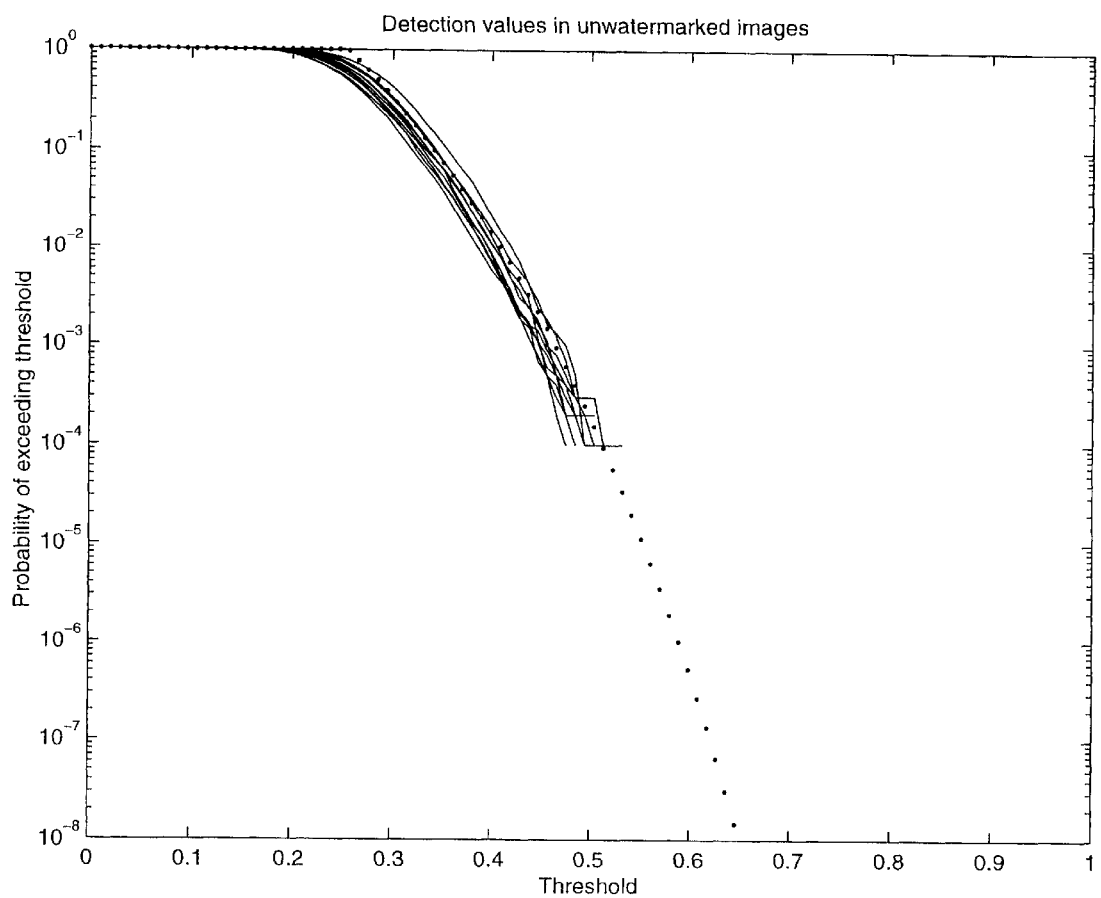
FIG. 8b is a graph of false positive rates measured with the final detection value from 10,000 unwatermarked images, plotted with theoretical estimates.

FIG. 8(b) shows how well this function predicts $P\{D_{max}>T\}$ in our experiment.

Fidelity

Figure 9:
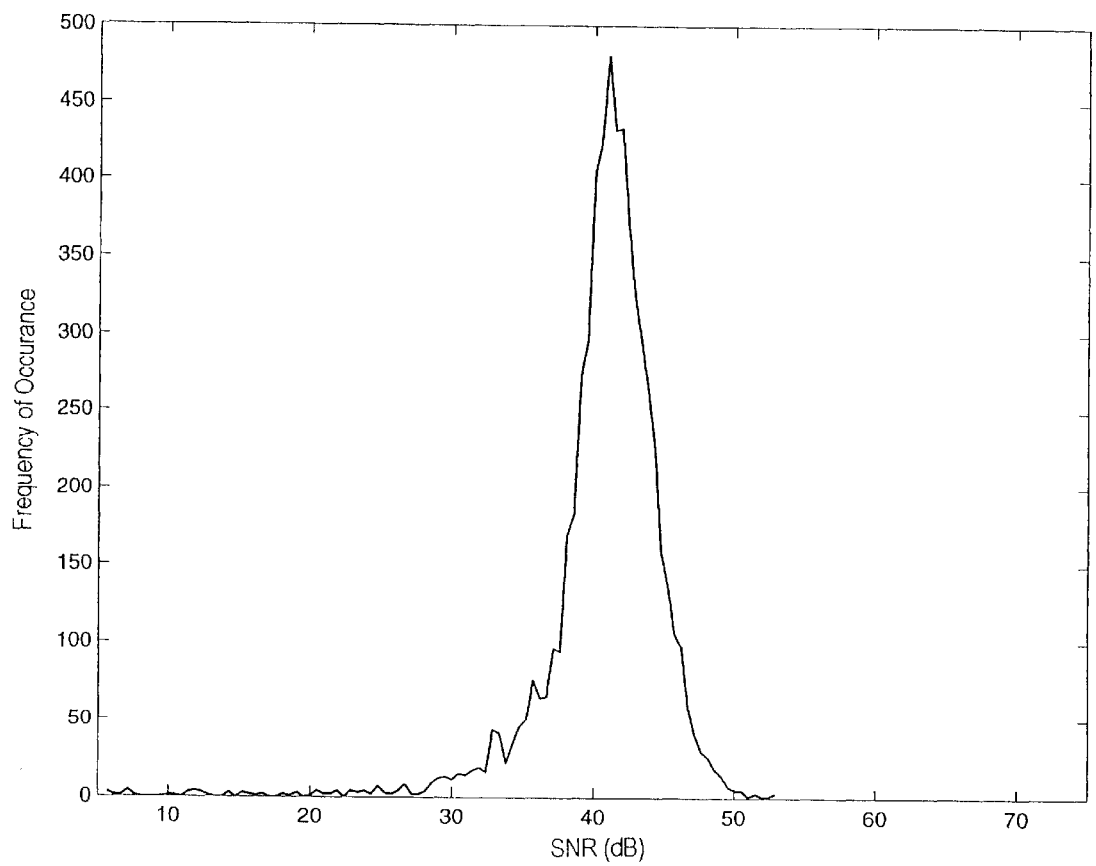
FIG. 9 illustrates a histogram of signal to noise ratio.
Figure 10:
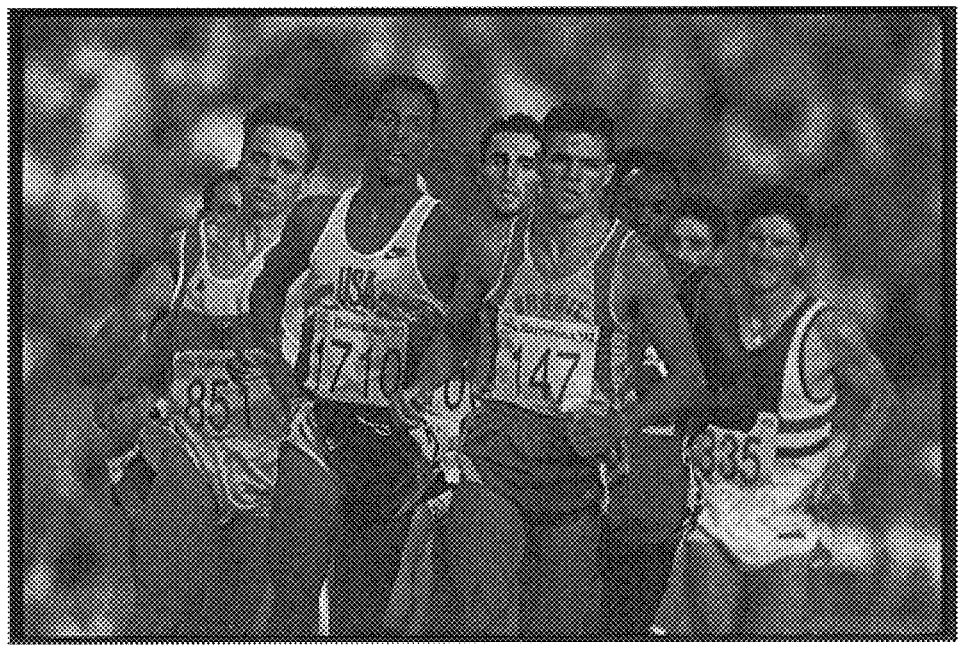
FIG. 10 illustrates a watermarked image with little impact on the fidelity of the image.

The tradeoff between fidelity and robustness is controlled by adjusting the weights used in the mixing function (discussed above). If the weight of the watermark is increased, then a stronger watermark will be embedded at the expense of lower fidelity. In our experiments, the same weights are used for every image. The weights were chosen so that we usually obtained a signal-to-noise ratio of about 40 dB. Here the "signal" is the image, and the "noise" is the watermark pattern. FIG. 9 shows a histogram of the ratios obtained. FIG. 10 shows an example of a watermarked image with little impact on fidelity.

It must be noted, however, that signal-to-noise ratio is not a very effective predictor of perceptual quality. The fidelity of the image depends to a large degree on the perceptual relationship between the image and the noise. In general, noise that matches the underlying textures in an image is less perceptible than noise that is very different from the image, even at the same signal-to-noise ratios.

Figure 11:
FIG. 11 illustrates the character of watermark noise in a watermarked image where the watermark strength is too high.

The present system generates watermark patterns by making small percentage adjustments to the powers of frequencies in the image's spectrum, so the resulting noise pattern is usually similar to the textures in the image. Thus, when we watermark an image that contains a homogeneous texture, the watermark is well-hidden. But when we mark an image that contains widely varying textures, the mark can become visible. FIG. 11 illustrates the problem. The watermark strength in FIG. 11 was increased so that the problem should be visible after printing in a journal.

Solving the fidelity problem in non-homogeneous images would require a modification to the algorithm that attenuates or shapes the watermark according to local texture characteristics.

Rotation

Two experiments were performed to test the robustness of a watermark inserted by the methods of the present invention against rotation. The first experiment was designed to isolate the effects of rotation from all other types of attack. The second was a more realistic test of the effects of rotation with cropping.

Figure 12A:
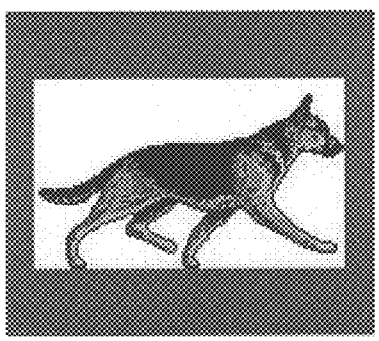
FIG. 12a illustrates an image having padding outside of the image boundary.
Figure 12E:
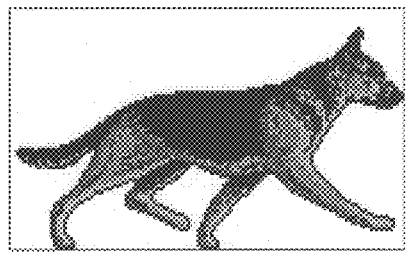
Figure 12B:
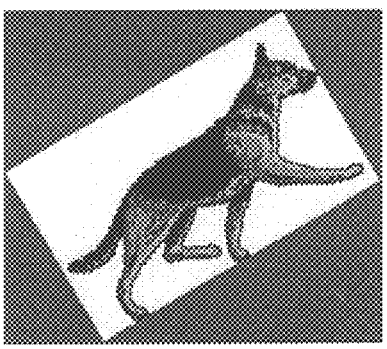
FIG. 12b illustrates the padded image of FIG. 12a rotated by a predetermined angle and then cropped back to its original size.

Each trial of the first test comprised the following steps:
1. Pad an image with neutral gray, increasing its size. The amount of padding was chosen to allow rotation without any part of the original image going outside of the image boundaries (FIG. 12(a)).
2. Embed a randomly-selected watermark in the padded image.
3. Replace the padding with neutral gray again. This removes any watermark information from the neutral gray area.
4. Run the watermark detector on the image to obtain a detection value before rotation.
5. Rotate the image by a predetermined angle, and crop to the original size. FIG. 12(b) shows what an image looks like after this step. Note that only the padding is cropped, so we do not crop off any of the watermark pattern.
6. Run the watermark detector on the image to obtain a detection value after rotation.

Since the padding that's cropped off during rotation contains no watermark pattern, any difference between the "before" value obtained in step 4 and the "after" value obtained in step 6 can only result from the effects of rotation.

This experiment was performed on 2,000 images with rotations of 4°, 8°, 30°, and 45°. We limited this test to a maximum rotation of 45° because rotations beyond 45° are equivalent to smaller rotations after a rotation of 90°. An image that has been rotated 90° yields exactly the same extracted vector as an unrotated image, so a rotation of greater than 45° should behave the same as a smaller rotation.

Figure 13A:
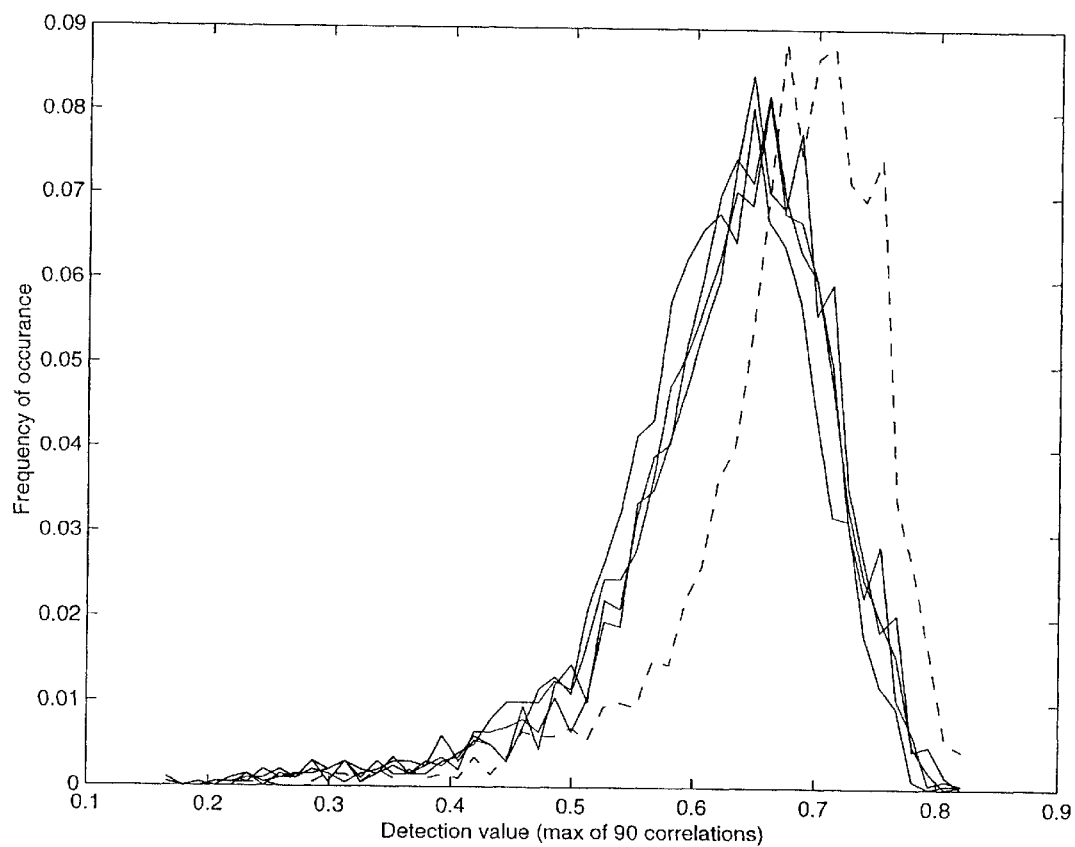
FIGS. 13a and 13b illustrate histogram and receiver-operating-characteristic (ROC) curves for 20,000 watermarked images after being processed by rotation without cropping as illustrated in FIG. 12b.
Figure 13B:
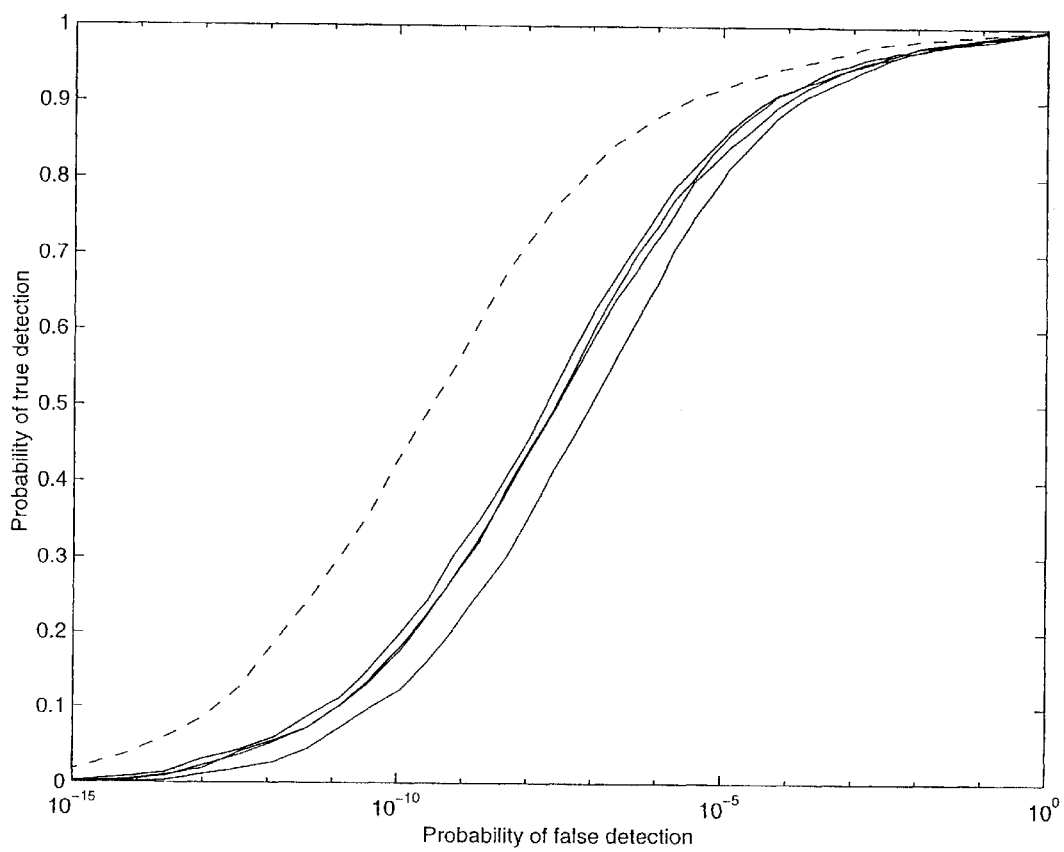

As indicated in FIG. 13(a), the different rotations yielded essentially the same results. FIG. 13(b) shows receiver-operating-characteristic (ROC) curves before and after rotation. For each of the ROC curves, the false-positive probabilities were estimated using the method described above.

Figure 12F:
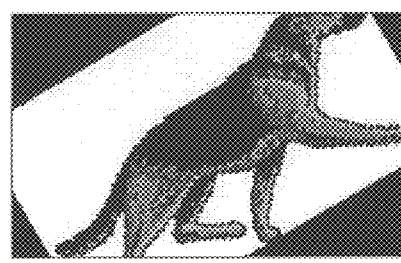
FIG. 12f illustrates the unpadded image of FIG. 12e rotated by a predetermined angle and then cropped back to its original size.
Figure 14A:
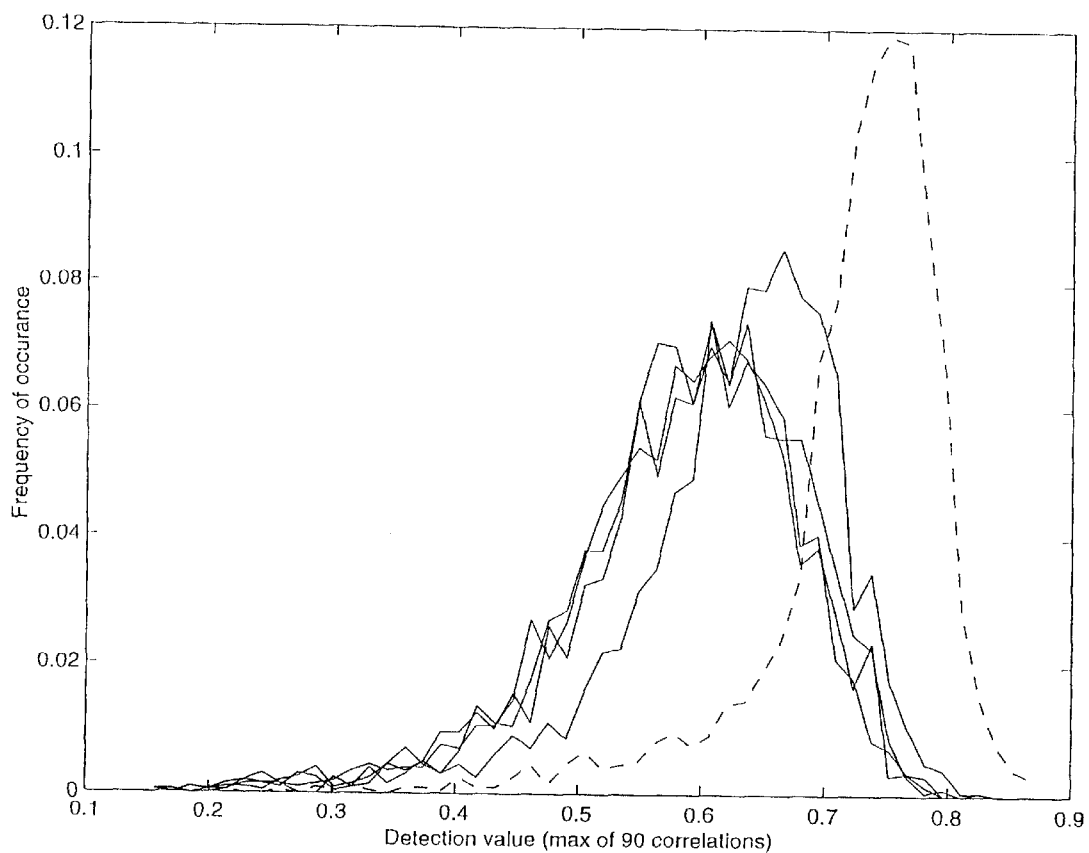
FIGS. 14 and 14b illustrate histogram and receiver-operating-characteristic (ROC) curves for 20,000 watermarked images after being processed by rotation with cropping as illustrated in FIG. 12f.
Figure 14B:
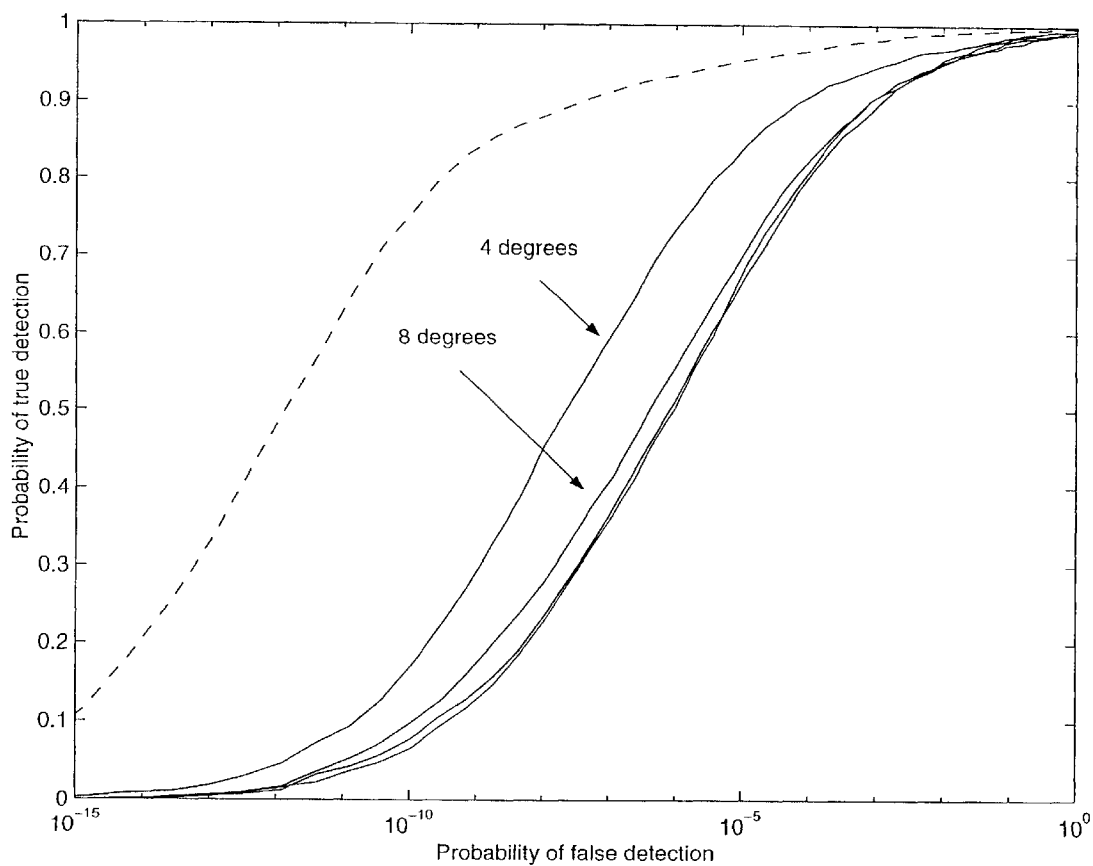

In the second experiment, we watermarked the original image without padding, and allowed part of the watermark pattern to be cropped off after rotation. FIG. 12(f) shows an example of what an image looked like after the rotation. This experiment was performed on 2,000 images with rotations of 4°, 8°, 30°, and 45°. FIGS. 14a and 14b shows the results.

The results of these experiments indicate that rotation alone has only a small effect on the probability of detection. The primary effects on detection probability are how well the watermark is embedded initially, and how much of the watermark is cropped off. In the first experiment, all the cropping happens before we rotate when we replace the padding with unwatermarked gray. The second experiment shows a larger effect of rotation, and larger variation between the different rotation angles, because different rotations result in different amounts of cropping.

Scale

To test robustness to scaling, three experiments were performed. The first and second test the effect of scaling up, with and without cropping. The third tests the effect of scaling down, with padding.

Figure 12G:
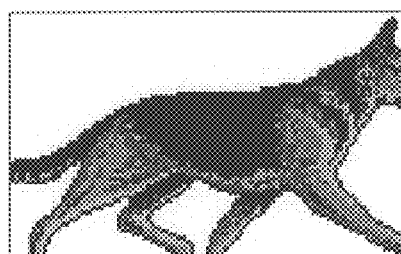
FIG. 12g illustrates the unpadded image of FIG. 12e scaled by a predetermined factor greater than 1 and then cropped back to its original size.
Figure 12C:
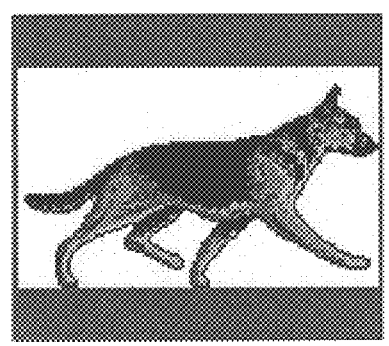
FIG. 12c illustrates the padded image of FIG. 12a scaled by a predetermined factor greater than 1 and then cropped back to its original size.
Figure 15A:
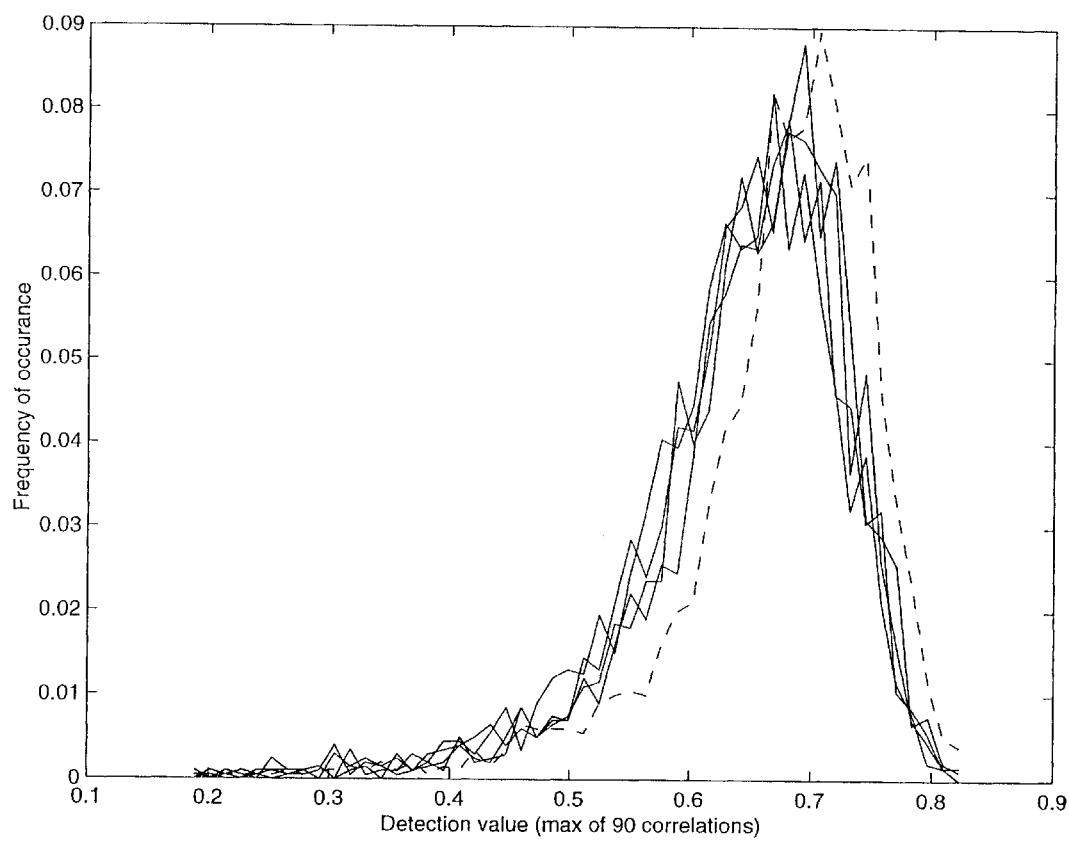
FIGS. 15a and 15b illustrate the histogram and receiver-operating-characteristic (ROC) curves for 20,000 watermarked images after being processed by scale change with scale factor>1, without cropping as illustrated in FIG. 12c.
Figure 15B:
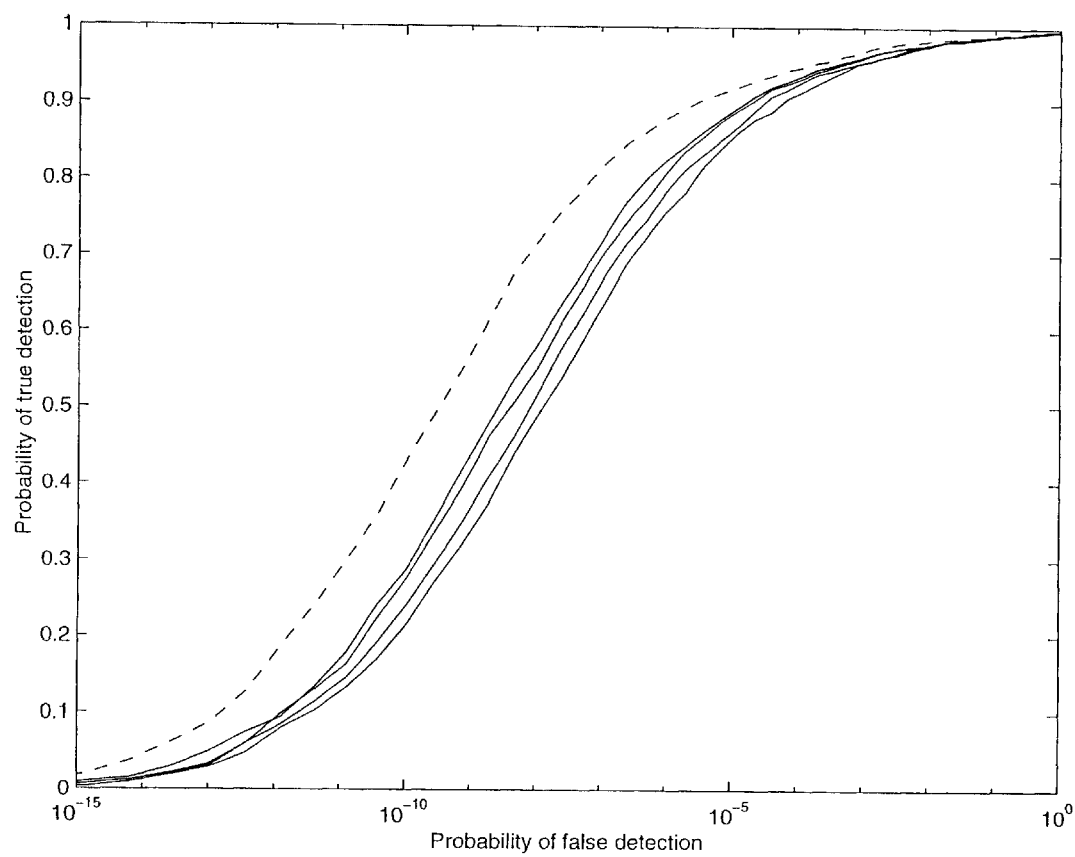

In the first scaling test, the steps performed for each trial were the same as those for the first rotation step, with the exception that instead of rotating the image we scaled the image up. FIG. 12(c) shows an example of an image that has been scaled up after padding and watermarking. The test was performed on 2,000 images at scales 5%, 10%, 15%, and 20% larger than the original. The results are shown in FIGS. 15a and 15b.

Figure 16A:
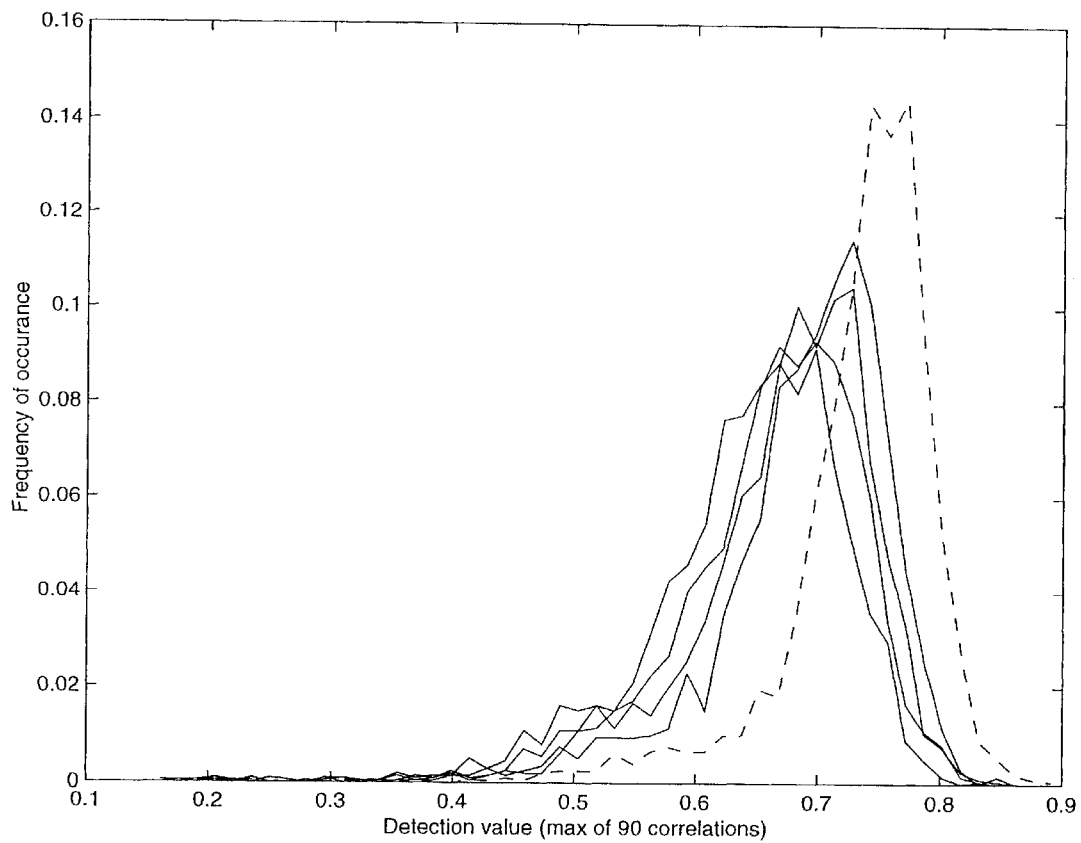
FIGS. 16a and 16b illustrate histogram and receiver-operating-characteristic (ROC) curves for 947 watermarked images after being processed by scale change with scale factor>1, with cropping as illustrated in FIG. 12g.
Figure 16B:
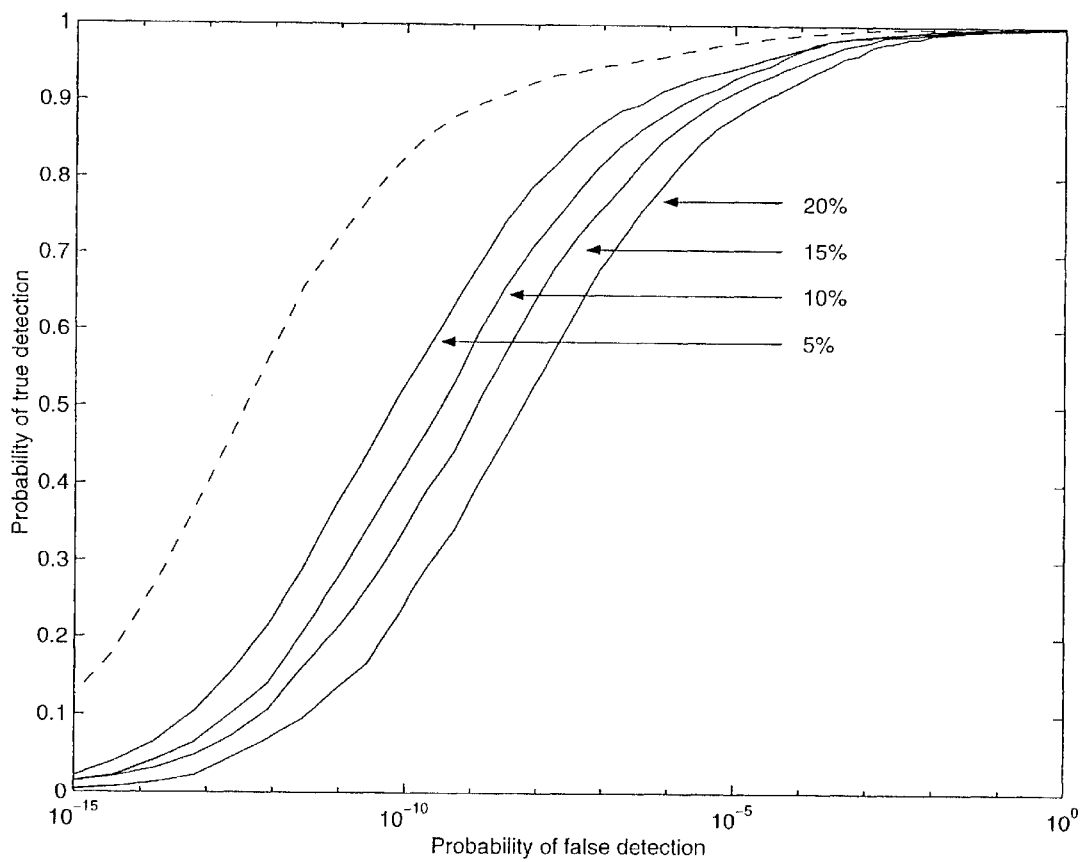

The second test was the same as the first except without padding the images before scaling, so part of the image was cropped off after scaling. FIG. 12(g) illustrates the attack. The test was performed on 947 images at scales of 5%, 10%, 15%, and 20% larger than the original. The results are shown in FIGS. 16a and 16b.

Figure 12H:
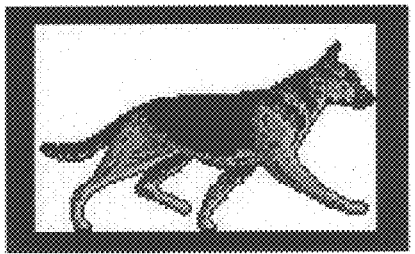
FIG. 12h illustrates the unpadded image of FIG. 12e scaled by a predetermined factor less than 1 and then padded to its original size.
Figure 17A:
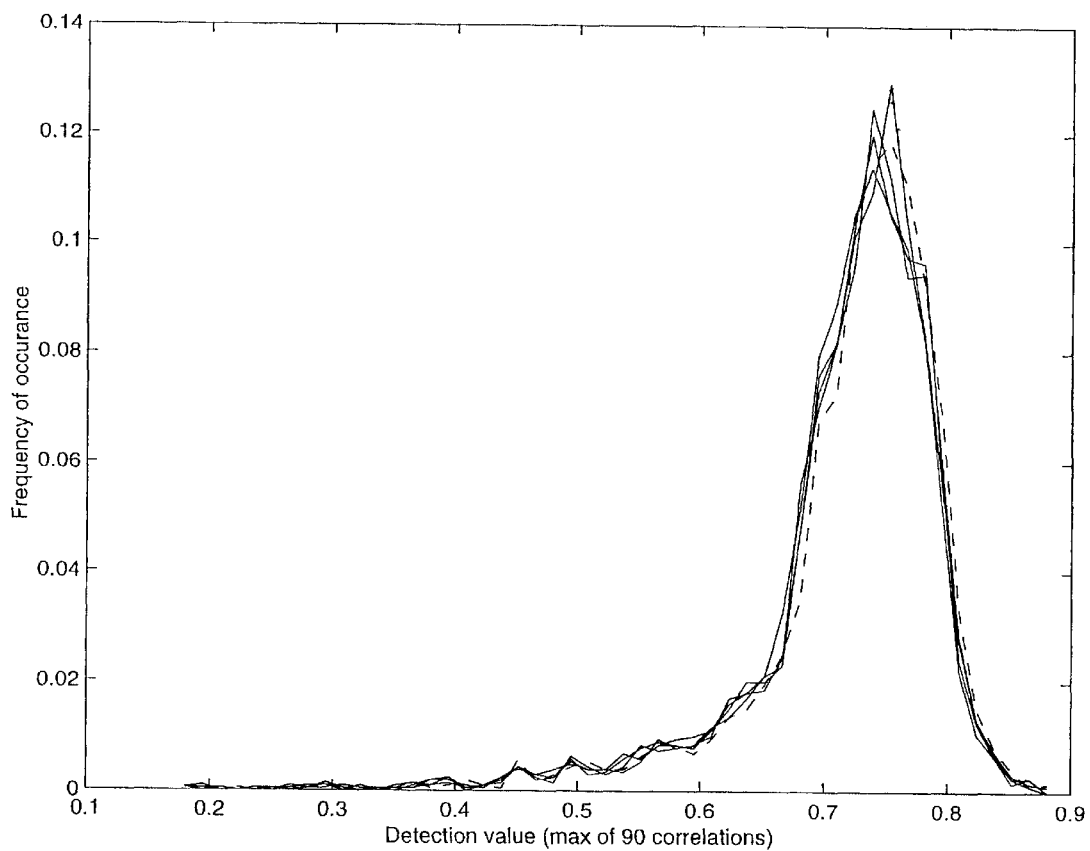
FIGS. 17a and 17b illustrate histogram and receiver-operating-characteristic (ROC) curves for 20,000 watermarked images after being processed by scale change with scale factor<1 as illustrated in FIG. 12h.
Figure 17B:
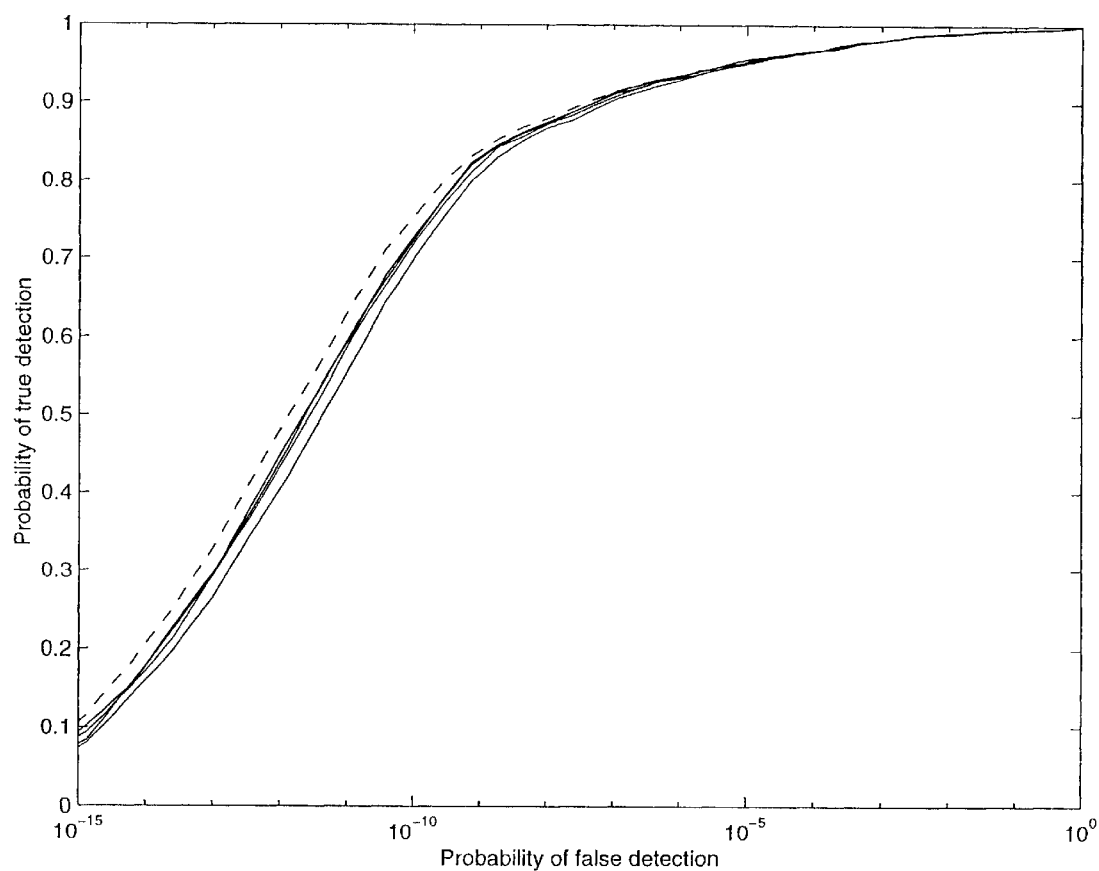

For the test of reduced scaling, we do not have to be concerned with cropping. Rather, after watermarking and scaling, the image is padded back to its original size. Since cropping is not an issue here, we only performed one version of this experiment, in which the image was not padded before watermarking as shown in FIG. 12(h). The test was performed on 2,000 images at scales 5%, 10%, 15%, and 20% smaller than the original. The results are shown in FIGS. 17a and 17b.

As with rotation, scaling by up to 20% appears to have very little impact on the probability of detection. In fact, decreasing size by up to 20% has essentially no impact on detection, except at very high thresholds. The results show that the cropping which often accompanies an increase in scale can degrade the watermark detection.

Translation

It is expected that translation alone would have no effect on the watermark, since the watermark is computed from the magnitudes of the Fourier coefficients. To test this, two experiments were performed.

Figure 12D:
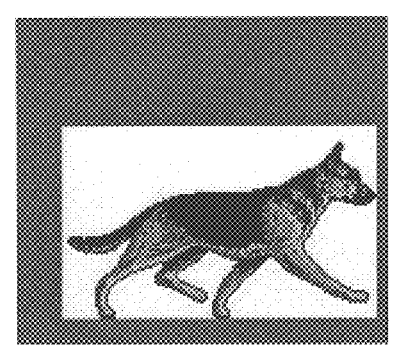
FIG. 12d illustrates the padded image of FIG. 12a translated by a predetermined percentage of the image size.
Figure 18A:
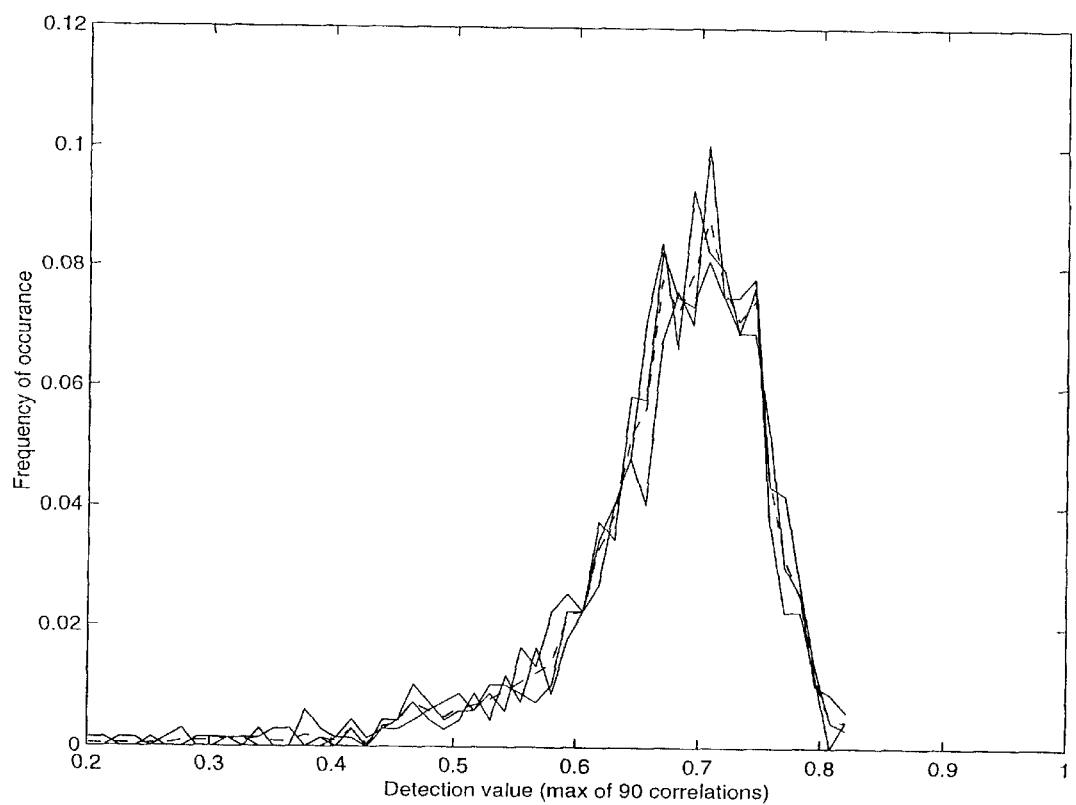
FIGS. 18a and 18b illustrate histogram and receiver-operating-characteristic (ROC) curves for 20,000 watermarked images after being processed by translation without cropping as illustrated in FIG. 12d.
Figure 18B:
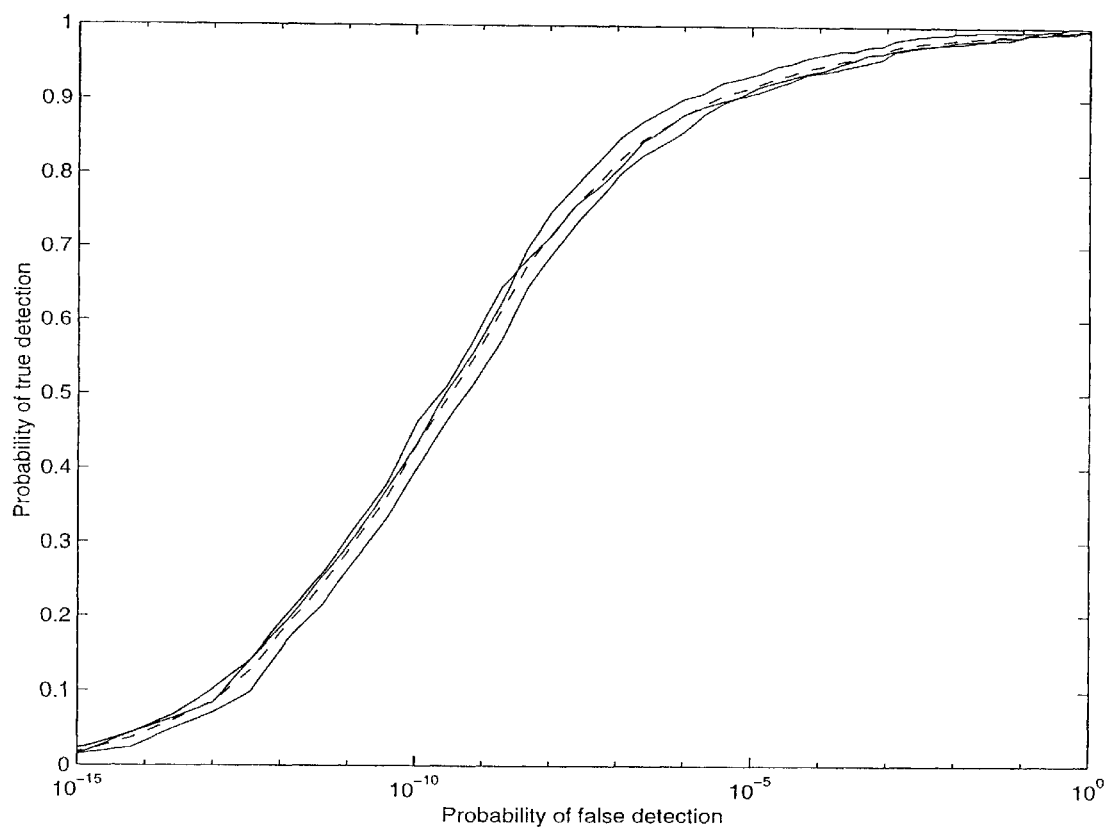

The first experiment was similar to the first rotation and scaling experiments, in that the image was padded before watermarking and the padding was replaced after watermarking. We then translated the image by cropping gray off the top and right, and padding gray onto the bottom and left. FIG. 12(d) shows an example of such a translated image. The experiment was performed on 2,000 images at translations of 5%, 10%, and 15% of the image size. The results are shown in FIGS. 18a and 18b.

Figure 12I:
FIG 12i illustrates the unpadded image of FIG. 12e translated by a predetermined percentage of the image size and then cropped back to its original size.
Figure 19A:
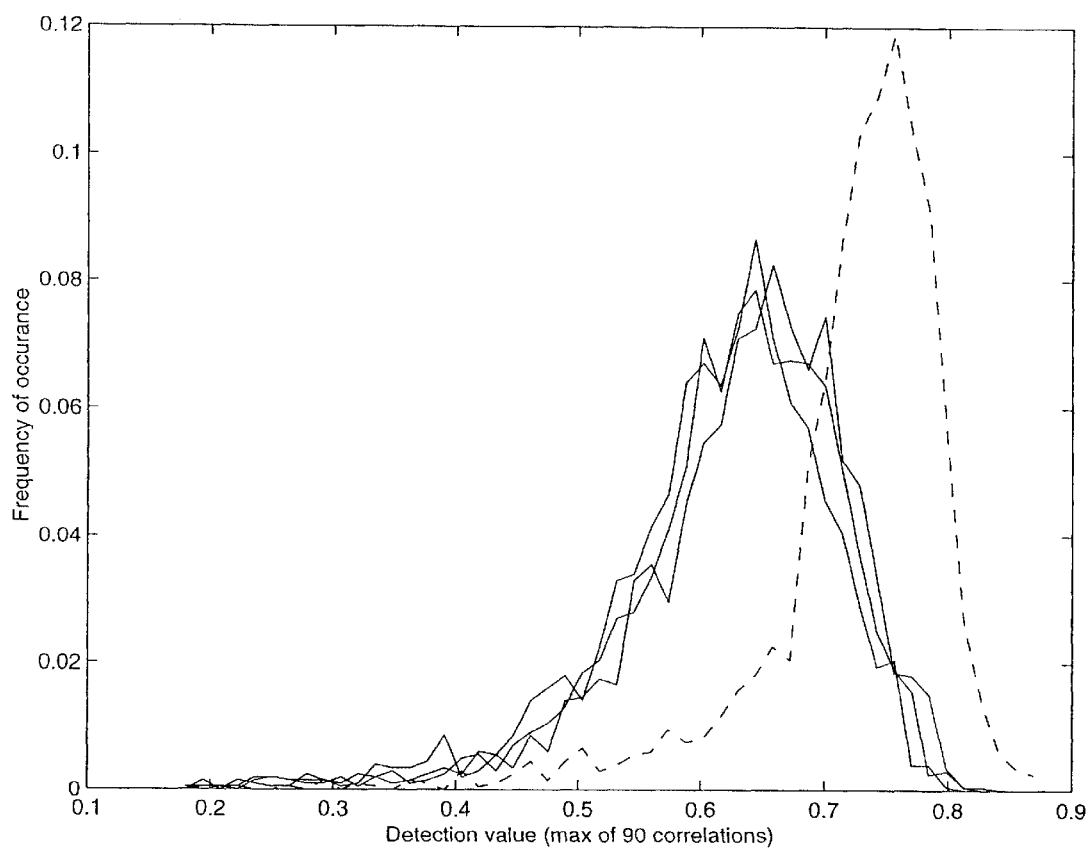
FIGS. 19a and 19b illustrate histogram and receiver-operating-characteristic (ROC) curves for 20,000 watermarked images after being processed by translation with cropping as illustrated in FIG. 12i.
Figure 19B:
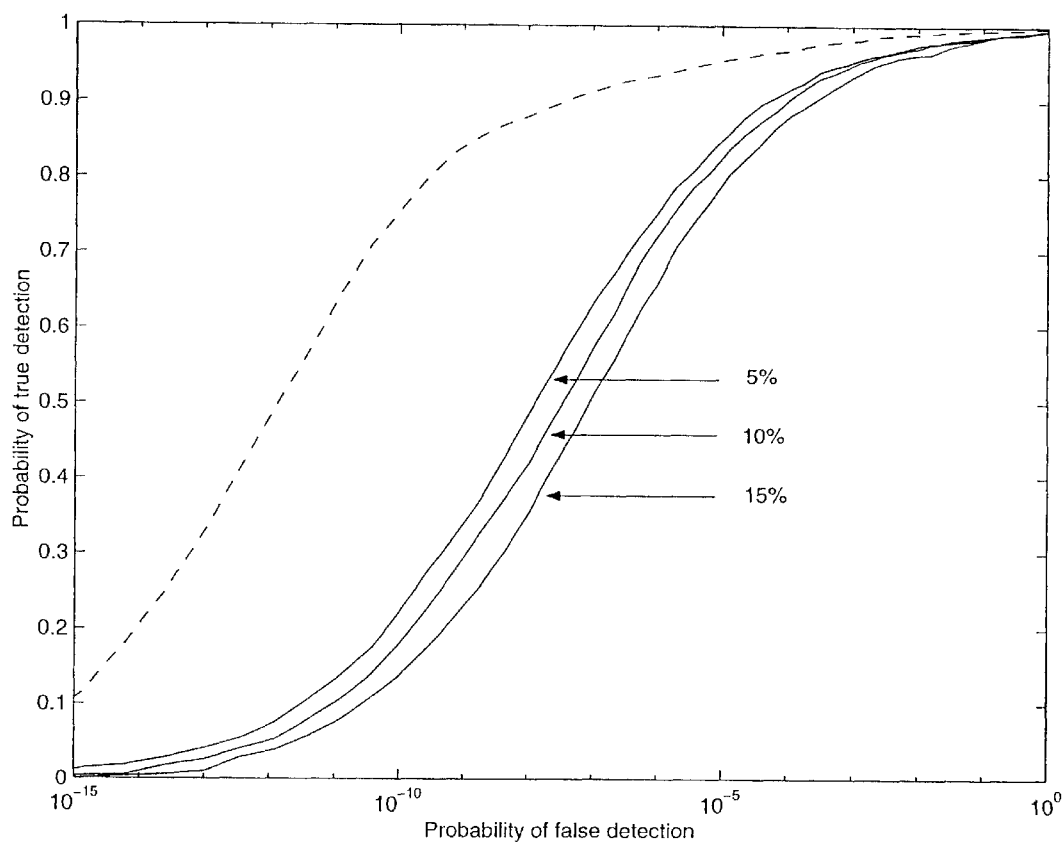

The second translation test was performed without padding the image before translation, so that part of the watermark pattern is cropped during translation. FIG. 12(i) shows an example of this attack. Again, the experiment was performed on 2,000 images at translations of 5%, 10%, and 15% of the image size. The results are shown in FIGS. 19a and 19b.

The results of the first experiment show that translation has negligible effect on probability of detection. This means that the second test is more a test of robustness to cropping than to translation, and we see the same sort of pattern that was observed in the second rotation and scaling experiments.

JPEG Compression

While the purpose of the present watermark design is to survive RST transformations, it is, of course, important that the watermarks also survive other common types of image processing. Tests were also conducted on robustness to JPEG compression.

Figure 20A:
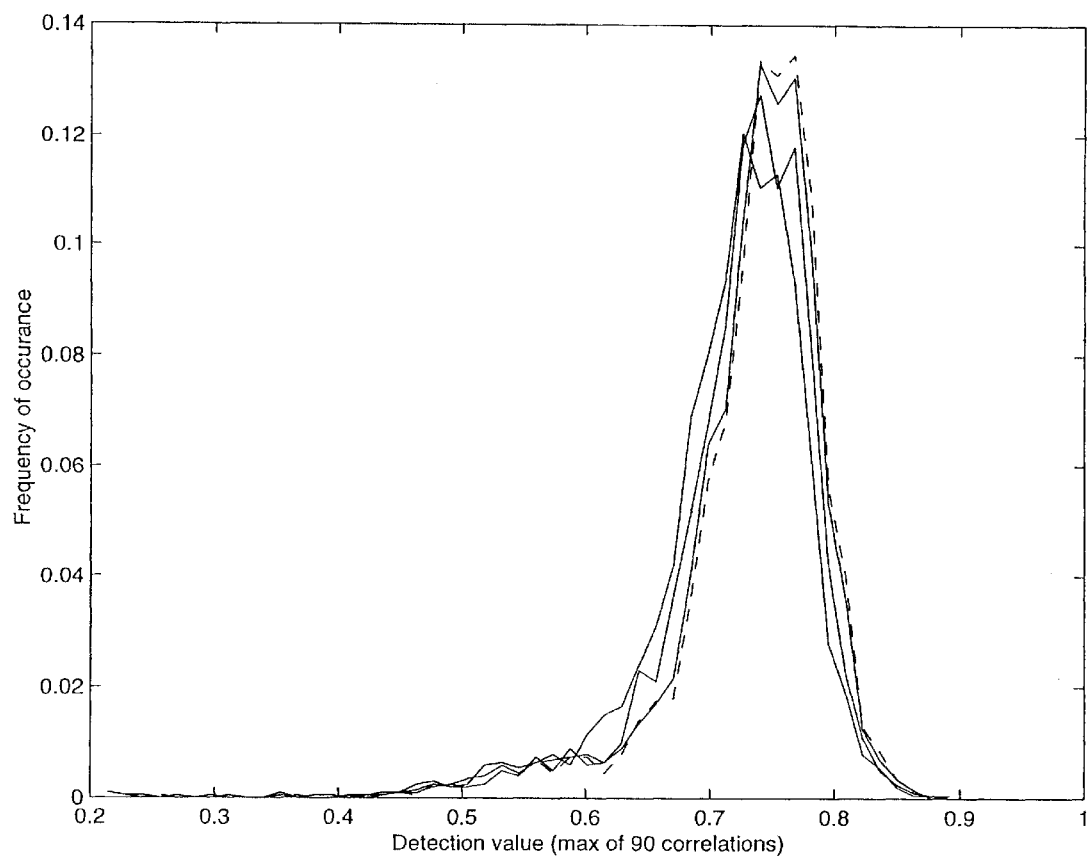
FIGS. 20a and 20b illustrates histogram and receiver-operating-characteristic (ROC) curves for 1,909 watermarked images after JPEG compression at differing quality factors.
Figure 20B:
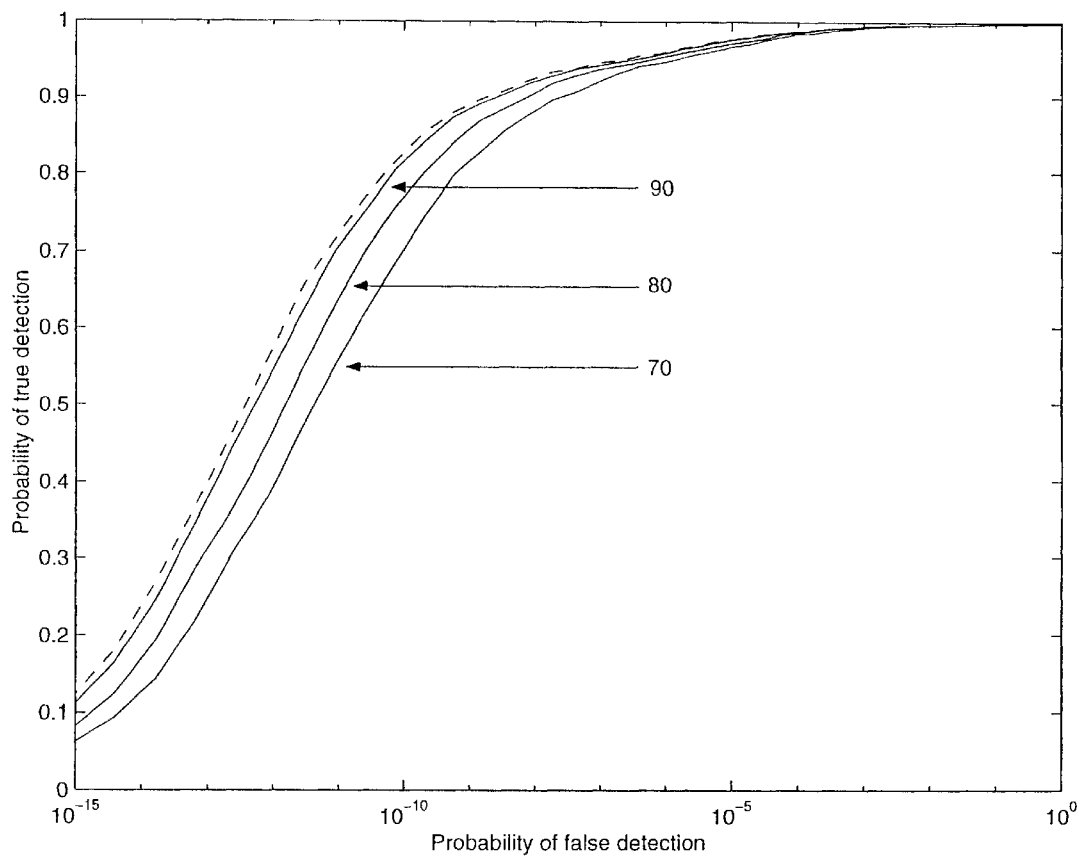

After watermarking, images were JPEG compressed at quality factors of 100%, 90%, 80%, and 70%. The test was performed on 1,909 images. FIGS. 20a and 20b show the results.

Thus, the methods of the present invention also show some resistance to mild JPEG compression.

Geometric distortions continue to be a major weakness for many watermarking methods. The methods of the present invention provide a solution to the common problems of rotation, scale, and translation. This solution is related to earlier proposals in the pattern recognition literature regarding invariants of the Fourier-Mellon transform. However, unlike those proposals, an invariance relationship is not explicitly derived.

Instead of creating a truly RST invariant signal, a signal is created that can be searched for the effects of RST in a trivial manner. The calculation of this projection is performed by taking the Fourier transform of the image, performing a log-polar resampling and then integrating along the radial dimension. It is important to note that an alternative implementation can be performed using other transforms such as the Radon transform.

The one-dimensional watermark has a many-to-one mapping to the two-dimensional image space. This is advantageous, especially when the embedder is based on the principle of communications with side information. The implementation disclosed herein is a very simple example of this principle can lead to significant improvements.

Experimental results on a database of over 2,000 images clearly demonstrate that the method of the present invention is robust to either rotations, scale changes or translations. It is also robust to some JPEG compression, and has some resistance to cropping.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for inserting a watermark signal in digital image data to obtain a watermarked image, the method comprising the steps of:
   computing a log-polar Fourier transform of the image data to obtain a log-polar Fourier spectrum;
   projecting the log-polar Fourier spectrum down to a lower dimensional space to obtain an extracted signal;
   modifying the extracted signal such that it is similar to a target watermark;
   performing a one-to-many mapping of the modified signal back to log-polar Fourier transform space to obtain a set of watermarked coefficients; and
   performing an inverse log-polar Fourier transform on the set of watermarked coefficients to obtain a watermarked image.

2. The method of claim 1, wherein the projecting step comprises projecting the log-polar Fourier spectrum down to a one dimensional space.

3. The method of claim 1, further comprising the steps of:
   computing a mixed signal between the extracted signal and the target watermark signal; and
   modifying the image data such that the mixed signal becomes the extracted signal.

4. The method of claim 3, wherein mixed signal is computed by a weighted average of the target watermark signal and the extracted signal.

5. The method of claim 3, wherein the step of modifying the image data such that the mixed signal is the extracted signal comprises:

modifying all values in column j of the log-polar Fourier transform such that their logs sum to $s_j$ instead of $v_j$, where s is the target watermark signal and v is the extracted signal;

inverting a log-polar resampling of the Fourier magnitudes, to obtain a modified Cartesian Fourier magnitude;

scaling the complex terms of the original Fourier transform to have the new magnitudes found in the modified Fourier transform; and applying an inverse Fourier transform to obtain the watermarked image.

6. The method of claim 1, wherein the step of computing a log-polar Fourier transform of the image data to obtain a log-polar Fourier spectrum is approximated by the steps of:

padding the image data with black to obtain a larger padded image;

computing the discrete Fourier transform of the padded image; and resampling the discrete Fourier transform in a log-polar grid using an interpolation technique.

7. The method of claim 6, wherein the interpolation technique comprises the step of linearly interpolating magnitudes of coefficients of the discrete Fourier transform.

8. A method for detecting a watermark signal in digital image data, the method comprising the steps of:

computing a log-polar Fourier transform of the image data to obtain a log-polar Fourier spectrum;

projrcting the log-polar Fourier spectrum down to a lower dimensional space to obtain an extracted signal;

comparing the extracted signal to a target watermark signal; and declaring the presence or absence of the target watermark signal in the image data based on the comparison.

9. The method of claim 8, further comprising the step of applying a whitening filter to both the extracted signal and the target watermark signal prior to the comparing step.

10. The method of claim 8, wherein the comparing step further comprises the step of computing a correlation coefficient between the target watermark signal and the extracted signal.

11. The method of claim 10, further comprising the step of applying a whitening filter to both the extracted signal and the target watermark signal prior to computing the correlation coefficient.

12. The method of claim 10, wherein the declaring step comprises comparing the correlation coefficient to a detection threshold.

13. The method of claim 12, wherein the image data is declared to contain the target watermark if the correlation coefficient is above the detection threshold.

14. The method of claim 13, wherein the image data is declared to not contain the target watermark if the correlation coefficient is below the detection threshold.

* * * * *